(12) United States Patent
Tanaka et al.

(10) Patent No.: US 11,709,254 B2
(45) Date of Patent: Jul. 25, 2023

(54) SAR IMAGE ANALYSIS SYSTEM, IMAGE PROCESSING APPARATUS, IMAGE PROCESSING METHOD, AND IMAGE PROCESSING PROGRAM

(71) Applicant: NEC Corporation, Tokyo (JP)

(72) Inventors: Taichi Tanaka, Tokyo (JP); Osamu Hoshuyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 412 days.

(21) Appl. No.: 16/767,805

(22) PCT Filed: Dec. 1, 2017

(86) PCT No.: PCT/JP2017/043377
§ 371 (c)(1),
(2) Date: May 28, 2020

(87) PCT Pub. No.: WO2019/106850
PCT Pub. Date: Jun. 6, 2019

(65) Prior Publication Data
US 2020/0348411 A1    Nov. 5, 2020

(51) Int. Cl.
*G01S 13/90*    (2006.01)
(52) U.S. Cl.
CPC .................................... *G01S 13/90* (2013.01)
(58) Field of Classification Search
CPC ........ G01S 13/90; G01S 13/9023; G06T 7/00
USPC ........................................................ 342/25
See application file for complete search history.

(56) References Cited

U.S. PATENT DOCUMENTS

| | | | | |
|---|---|---|---|---|
| 8,482,453 B2 * | 7/2013 | Costantini | ........... | G01S 13/9023 342/25 R |
| 8,866,920 B2 * | 10/2014 | Venkataraman | ....... | H04N 23/90 348/340 |
| 8,885,059 B1 * | 11/2014 | Venkataraman | ......... | G02B 5/20 348/340 |

(Continued)

FOREIGN PATENT DOCUMENTS

| | | |
|---|---|---|
| JP | H8-94747 A | 4/1996 |
| JP | H9-281231 A | 10/1997 |

(Continued)

OTHER PUBLICATIONS

Japanese Office Action for JP Application No. 2019-556532 dated Jun. 22, 2021 with English Translation.

(Continued)

*Primary Examiner* — Nuzhat Pervin
(74) *Attorney, Agent, or Firm* — Sughrue Mion, PLLC

(57) ABSTRACT

This invention is directed to an image processing apparatus that generates an evaluation index of a persistent scatterer likelihood without any influence of a large phase change with respect to a target whose displacement is nonlinear, a target whose elevation is high, or a target whose displacement is large. The image processing apparatus includes a phase array accumulator that accumulates phase arrays of respective pixels over a plurality of images, a clustering unit that classifies the respective pixels into a plurality of clusters based on the phase arrays, and a phase correlation calculator that calculates a correlation between a phase change in each of the plurality of clusters and the phase array at the respective pixels.

20 Claims, 25 Drawing Sheets

(56) References Cited

U.S. PATENT DOCUMENTS

| | | | |
|---|---|---|---|
| 9,239,384 B1 * | 1/2016 | Chow | G06V 30/422 |
| 10,254,399 B1 * | 4/2019 | Simonson | G01S 13/9029 |
| 10,278,589 B2 * | 5/2019 | Zalev | A61B 8/4281 |
| 10,321,896 B2 * | 6/2019 | Herzog | A61B 5/0097 |
| 10,517,481 B2 * | 12/2019 | Zalev | A61B 8/0825 |
| 10,542,892 B2 * | 1/2020 | Herzog | A61B 5/0095 |
| 10,638,935 B2 * | 5/2020 | Zalev | A61B 8/5223 |
| 2019/0192006 A1 * | 6/2019 | Herzog | A61B 6/4405 |
| 2022/0031170 A1 * | 2/2022 | Schmid | A61B 8/4281 |

FOREIGN PATENT DOCUMENTS

| | | | |
|---|---|---|---|
| JP | 2004-191053 A | 7/2004 | |
| JP | 2006-221520 A1 | 8/2006 | |
| JP | 2008-14709 A | 1/2008 | |
| JP | 2008-157764 A | 7/2008 | |
| JP | 2009-289111 A | 12/2009 | |
| JP | 2017-72473 A | 4/2017 | |
| WO | 00/72045 A1 | 11/2000 | |
| WO | WO-0072045 A1 * | 11/2000 | G01S 13/9023 |
| WO | 2008/016153 A1 | 2/2008 | |
| WO | WO-2010000870 A1 * | 1/2010 | G01S 13/9023 |
| WO | 2015/008554 A1 | 1/2015 | |
| WO | WO-2015008554 A1 * | 1/2015 | G01S 13/9023 |
| WO | 2018/123748 A1 | 7/2018 | |
| WO | 2019/087673 | 5/2019 | |

OTHER PUBLICATIONS

Hoshuyama et al., "Persistent Scatterer Clustering Using Phase Correlation Graph for Structure Displacement Analysis", Information and Communication Engineers 2017, pp. 224, Mar. 7, 2017.

Tanaka et al., "Persistent Scatterer Clustering for Structure Displacement Analysis Based on Phase Correlation Network", IEEE IGARSS2017, pp. 4618 to 4621.

International Search Report for PCT Application No. PCT/JP2017/043377, dated Feb. 20, 2018.

* cited by examiner

| SCATTERER ID (PIXEL ID) | PERSISTENT SCATTERER CANDIDATE CONDITION ||||  PERSISTENT SCATTERER CANDIDATE FLAG (1/0) |
|---|---|---|---|---|---|
| | LUMINANCE STABILITY | POSITION STABILITY | PHASE STABILITY | ... | |
| A0001-0001 | | | | | 1 |
| A0001-0002 | | | | | 1 |
| A0001-0003 | | | | | 0 |
| A0001-0004 | | | | | 1 |
| ... | | | | | |

F I G. 5C

540

| CLUSTER ID (541) | SCATTERER ID (PIXEL ID) (542) | PHASE ARRAY (543) | PERSISTENT SCATTERER CANDIDATE FLAG (1/0) (544) |
|---|---|---|---|
| CL0001 | A0001-0001 | | 1 |
| | A0011-1000 | | 0 |
| | ⋮ | | |
| CL0001 | A0001-0002 | | 0 |
| | ⋮ | | |
| ⋮ | | | |

F I G.  5D

| CLUSTER ID ⌐551 | SCATTERER ID (PIXEL ID) ⌐552 | PHASE ARRAY ⌐553 | PHASE STATISTICS ⌐554 | |
|---|---|---|---|---|
| | | | PHASE ARRAY AVERAGE | PHASE ARRAY WEIGHTED MEAN |
| CL0001 | A0001-0001 | | | |
| CL0001 | A0011-1000 | | | |
| ... | ... | | | |
| CL0001 | A0001-0002 | | | |
| ... | ... | | | |

550

F I G. 5E

570

| SCATTERER ID (PIXEL ID) /571 | PERSISTENT SCATTERER CANDIDATE FLAG (1/0) /572 | PHASE CORRELATION CALCULATION RESULT /573 | PERSISTENT SCATTERER FLAG (1/0) /574 |
|---|---|---|---|
| A0001-0001 | 1 |  | 0 |
| A0001-0002 | 1 |  | 1 |
| ⋮ |  |  |  |

FIG. 5G

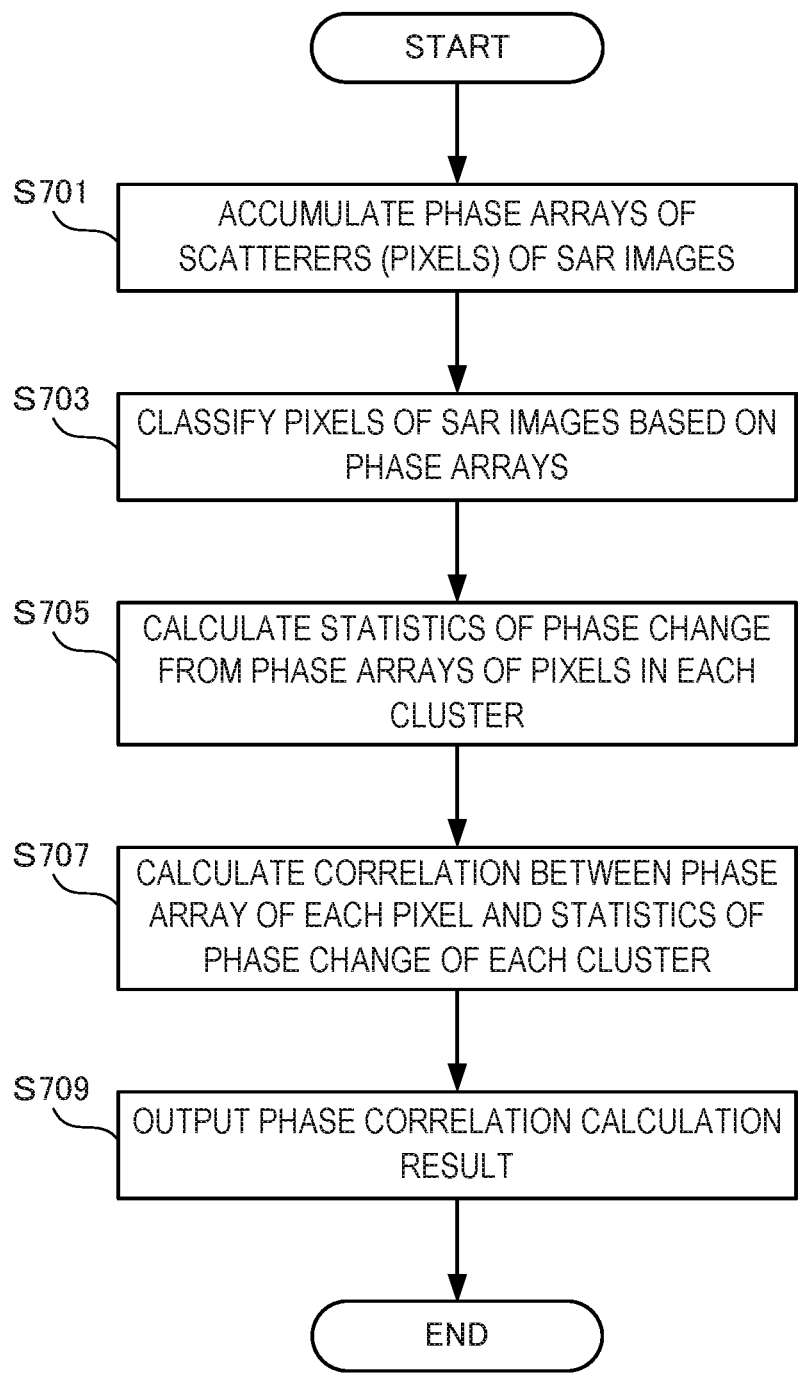
F I G. 7

| CLUSTER ID | PHASE STATISTICS | NOISE REMOVING METHOD | PHASE STATISTICS WITH NOISE REMOVED |
|---|---|---|---|
| CL0001 | | SELECT MAXIMUM EIGENVECTOR OBTAINED BY EIGENVALUE DECOMPOSITION | |
| | | SELECT SEVERAL LARGE EIGENVECTORS OBTAINED BY EIGENVALUE DECOMPOSITION | |
| | | ELIMINATE PHASES COMPARISON BETWEEN IMAGES WHOSE IMAGE CAPTURING TIMES ARE SEPARATED FROM EACH OTHER | |
| | | ... | |
| CL0002 | | SELECT MAXIMUM EIGENVECTOR OBTAINED BY EIGENVALUE DECOMPOSITION | |
| | | SELECT SEVERAL LARGE EIGENVECTORS OBTAINED BY EIGENVALUE DECOMPOSITION | |
| | | ELIMINATE PHASES COMPARISON BETWEEN IMAGES WHOSE IMAGE CAPTURING TIMES ARE SEPARATED FROM EACH OTHER | |
| ... | | | |

F I G. 9

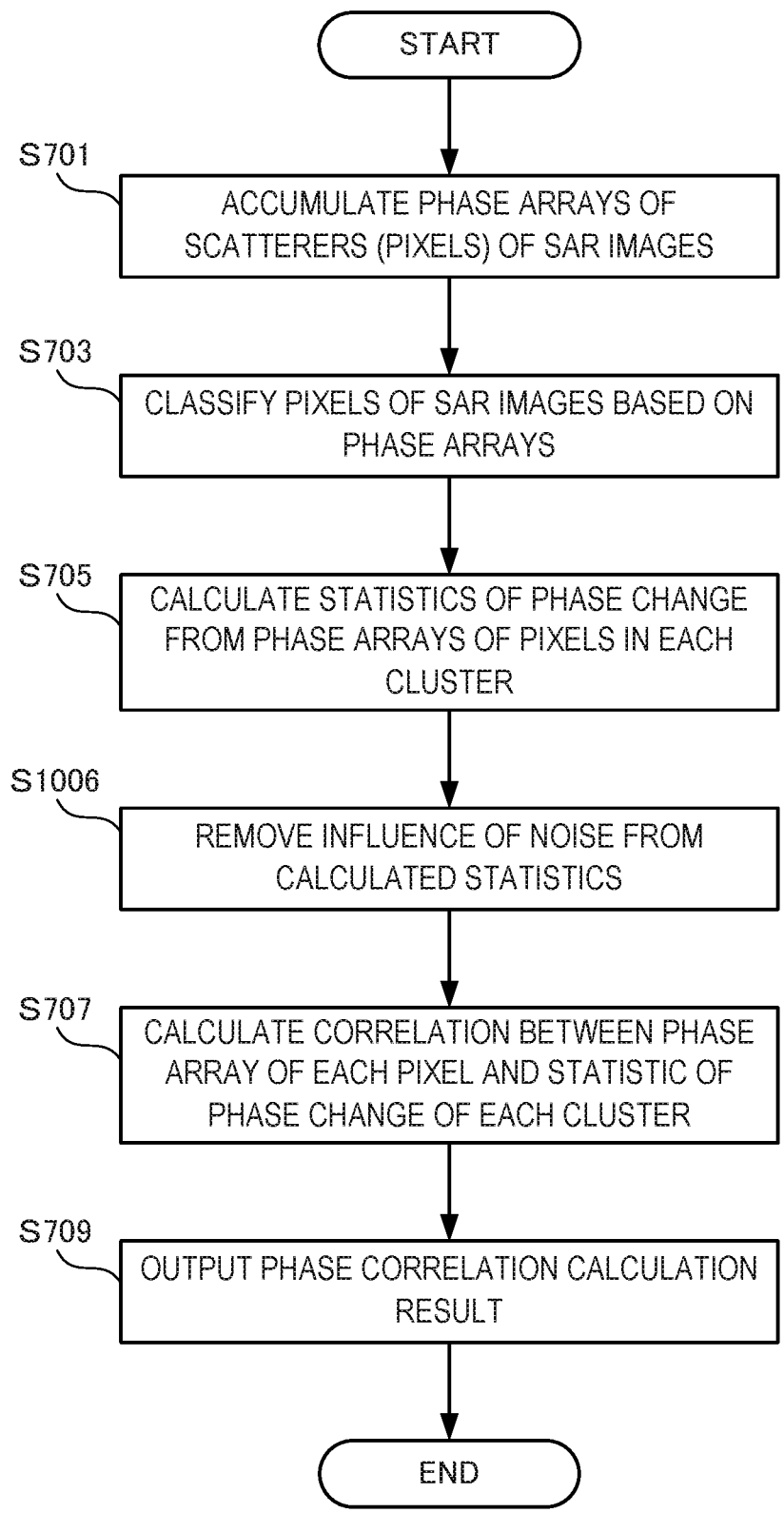
F I G. 10

FIG. 12A

| PHASE STATISTICS OF EACH CLUSTER / PHASE ARRAY IN EACH CLUSTER | 561 {PHASE ARRAY (A0001-0001) | PHASE ARRAY (A0001-0002) | PHASE ARRAY (A0001-0003) | PHASE ARRAY (A0001-0004) | ... |
|---|---|---|---|---|---|
| CLUSTER ID (SCATTERER ID) | | | | | |
| CL0001 { PHASE ARRAY (A0001-0001) | | | | | |
| PHASE ARRAY (A0011-1000) | | | | | |
| ... | | | | | |
| CL0002 { PHASE ARRAY (A0001-0002) | | | | | |
| ... | | | | | |

1210 → table; 1262 bracket below rows

| 1220 ↘ 1221 | 1222 CORRELATION WITH CLUSTER (CL0001) | | | 1223 CORRELATION WITH CLUSTER (CL0002) | | | ... |
|---|---|---|---|---|---|---|---|
| SCATTERER ID (PIXEL ID) | CORRELATION WITH PIXEL IN CLUSTER | CORRELATION STATISTICS | | CORRELATION WITH PIXEL IN CLUSTER | CORRELATION STATISTICS | | |
| | | CORRELATION AVERAGE | CORRELATION WEIGHTED MEAN | | CORRELATION AVERAGE | CORRELATION WEIGHTED MEAN | |
| A0001-0001 | ... | | | ... | | | |
| A0001-0002 | ... | | | ... | | | |
| ... | | | | | | | |

F I G. 12B

| SCATTERER ID (PIXEL ID) | PERSISTENT SCATTERER CANDIDATE CONDITION | | | | PHASE CORRELATION CALCULATION RESULT | UPDATE RESULT OF PERSISTENT SCATTERER CANDIDATE FLAG (1/0) |
|---|---|---|---|---|---|---|
| | LUMINANCE STABILITY | POSITION STABILITY | PHASE STABILITY | ... | | |
| A0001-0001 | | | | | | 1→1 |
| A0001-0002 | | | | | | 1→0 |
| A0001-0003 | | | | | | 0→0 |
| A0001-0004 | | | | | | 1→1 |
| ... | | | | | | |

F I G. 15

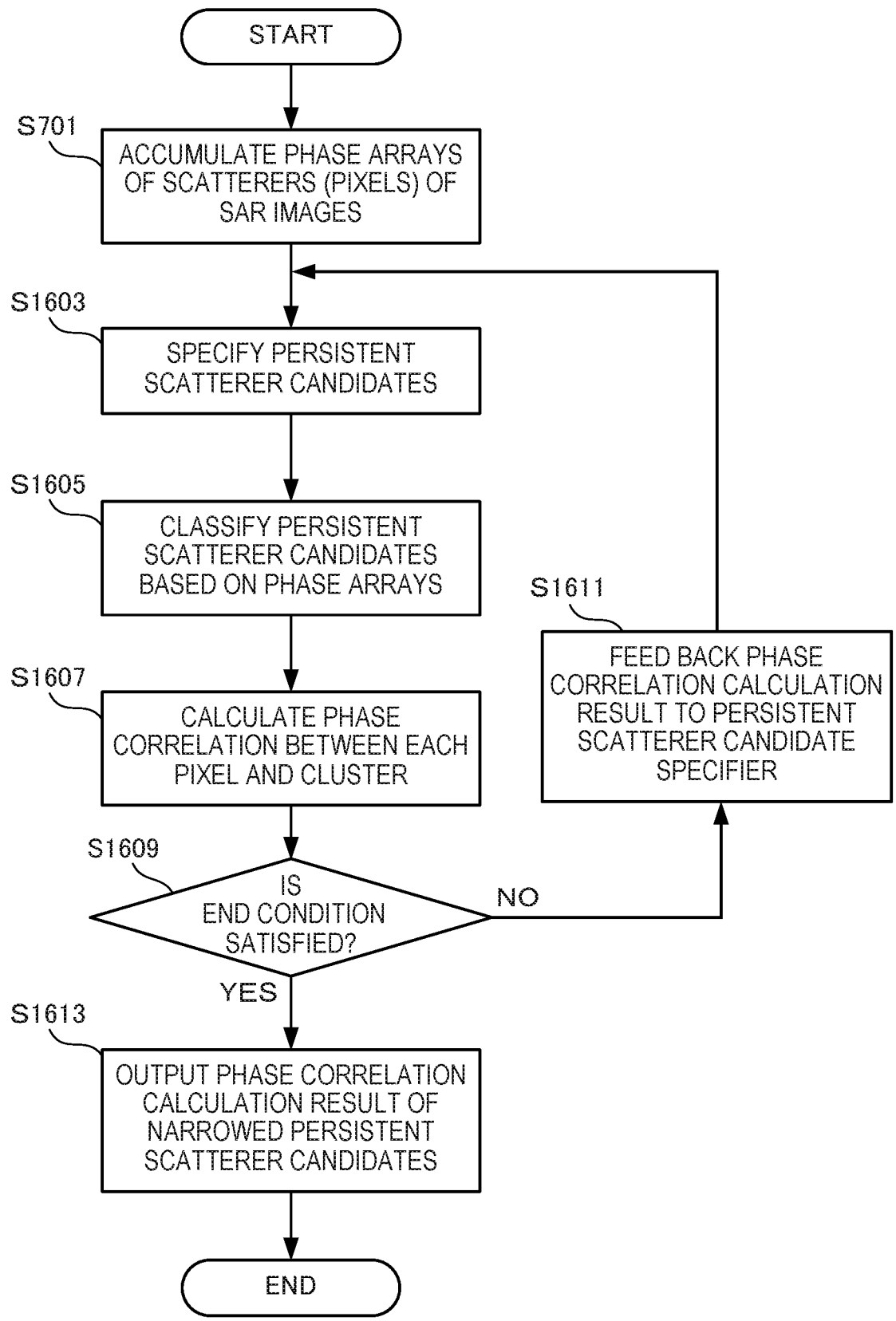
F I G. 16

SAR IMAGE ANALYSIS SYSTEM, IMAGE PROCESSING APPARATUS, IMAGE PROCESSING METHOD, AND IMAGE PROCESSING PROGRAM

This application is a National Stage Entry of PCT/JP2017/043377 filed on Dec. 1, 2017, the contents of all of which are incorporated herein by reference, in their entirety.

TECHNICAL FIELD

The present invention relates to a SAR image analysis system, an image processing apparatus, an image processing method, and an image processing program.

BACKGROUND ART

In the above technical field, patent literature 1 discloses an example of a SAR (Synthetic Aperture Rader) image analysis system. In the SAR image analysis system disclosed in patent literature 1, a model is fitted to a phase observed at each persistent scatterer candidate, and a model that is displaced linearly with time is assumed as the model to be fitted. It is specified how much model application shifts, and it is assumed that all phase changes which does not fit to the model are caused by noise which is not caused by an elevation, a displacement, or the atmospheric conditions, thereby specifying, as persistent scatterers, pixels at which an error is small. Finally, the persistent scatterers are input, and a displacement and an elevation are specified on each of the persistent scatterers. Thus, the persistent scatterers which are hardly influenced by noise and precise displacements/elevations at the persistent scatterers are output.

CITATION LIST

Patent Literature

Patent literature 1: Japanese PCT National Publication No. 2003-500658 (WO 00/72045)

Non-Patent Literature

Non-patent literature 1: IEEE IGARSS2017. "PERSISTENT SCATTERER CLUSTERING FOR STRUCTURE DISPLACEMENT ANALYSIS BASED ON PHASE CORRELATION NETWORK"

SUMMARY OF THE INVENTION

Technical Problem

In the technique described in the above patent literature, however, it is impossible to perform displacement measurement well with respect to a target whose displacement is nonlinear, a target whose elevation is high, or a target whose displacement is large.

The present invention provides a technique of solving the above-described problem.

Solution to Problem

One example aspect of the present invention provides an image processing apparatus comprising:

a phase array accumulator that accumulates phase arrays of respective pixels over a plurality of images;

a clustering unit that classifies the respective pixels into a plurality of clusters based on the phase arrays; and a phase correlation calculator that calculates a correlation between a phase change in each of the plurality of clusters and the phase array at the respective pixels.

Another example aspect of the present invention provides an image processing method comprising:

accumulating phase arrays of respective pixels over a plurality of images in a phase array accumulator;

classifying the respective pixels into a plurality of clusters based on the phase arrays; and calculating a correlation between a phase change in each of the plurality of clusters and the phase array at the respective pixels.

Still other example aspect of the present invention provides an image processing program for causing a computer to execute a method, comprising:

accumulating phase arrays of respective pixels over a plurality of images in a phase array accumulator;

classifying the respective pixels into a plurality of clusters based on the phase arrays; and calculating a correlation between a phase change in each of the plurality of clusters and the phase array at the respective pixels.

Still other example aspect of the present invention provides a SAR image analysis system comprising:

an image processing apparatus that specifies persistent scatterers based on a plurality of SAR images; and a SAR image analysis apparatus that analyzes the plurality of SAR images using data of the persistent scatterers, said image processing apparatus comprising, at least, a phase array accumulator that accumulates phase arrays of respective pixels over the plurality of SAR images, a clustering unit that classifies the respective pixels into a plurality of clusters based on the phase arrays, and a phase correlation calculator that calculates a correlation between a phase change in each of the plurality of clusters and the phase array at the respective pixels.

Still other example aspect of the present invention provides a SAR image analysis method comprising:

specifying persistent scatterers based on a plurality of SAR images; and analyzing the plurality of SAR images using data of the persistent scatterers, wherein the specifying persistent scatterers includes, at least, accumulating phase arrays of respective pixels over the plurality of SAR images in a phase array accumulator;

classifying the respective pixels into a plurality of clusters based on the phase arrays; and calculating a correlation between a phase change in each of the plurality of clusters and the phase array at the respective pixels.

Advantageous Effects of Invention

According to the present invention, it is possible to generate an evaluation index of a persistent scatterer likelihood without any influence of a large phase change with respect to a target whose displacement is nonlinear, a target whose elevation is high, or a target whose displacement is large.

BRIEF DESCRIPTION OF DRAWINGS

FIG. 5C is a table showing the structure of a persistent scatterer candidate table according to the second example embodiment of the present invention;

FIG. 5D is a table showing the structure of a cluster table according to the second example embodiment of the present invention;

FIG. 5E is a table showing the structure of a phase statistics table according to the second example embodiment of the present invention;

FIG. 5G is a table showing the structure of a persistent scatterer table according to the second example embodiment of the present invention;

FIG. 7 is a flowchart illustrating the processing procedure of the image processing apparatus according to the second example embodiment of the present invention;

FIG. 9 is a table showing the structure of a noise removing table according to the third example embodiment of the present invention;

FIG. 10 is a flowchart illustrating the processing procedure of an image processing apparatus according to the third example embodiment of the present invention;

FIG. 12A is a table showing the structure of a phase correlation table according to the fourth example embodiment of the present invention;

FIG. 12B is a table showing the structure of a phase statistics table according to the fourth example embodiment of the present invention;

FIG. 15 is a table showing the structure of a persistent scatterer candidate table according to the fifth example embodiment of the present invention;

FIG. 16 is a flowchart illustrating the processing procedure of the image processing apparatus according to the fifth example embodiment of the present invention.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

An image processing apparatus 100 according to the first example embodiment of the present invention will be described with reference to FIG. 1. The image processing apparatus 100 is an apparatus that generates an evaluation index of a persistent scatterer likelihood from the phase array of each pixel over a plurality of images.

Figure 1:
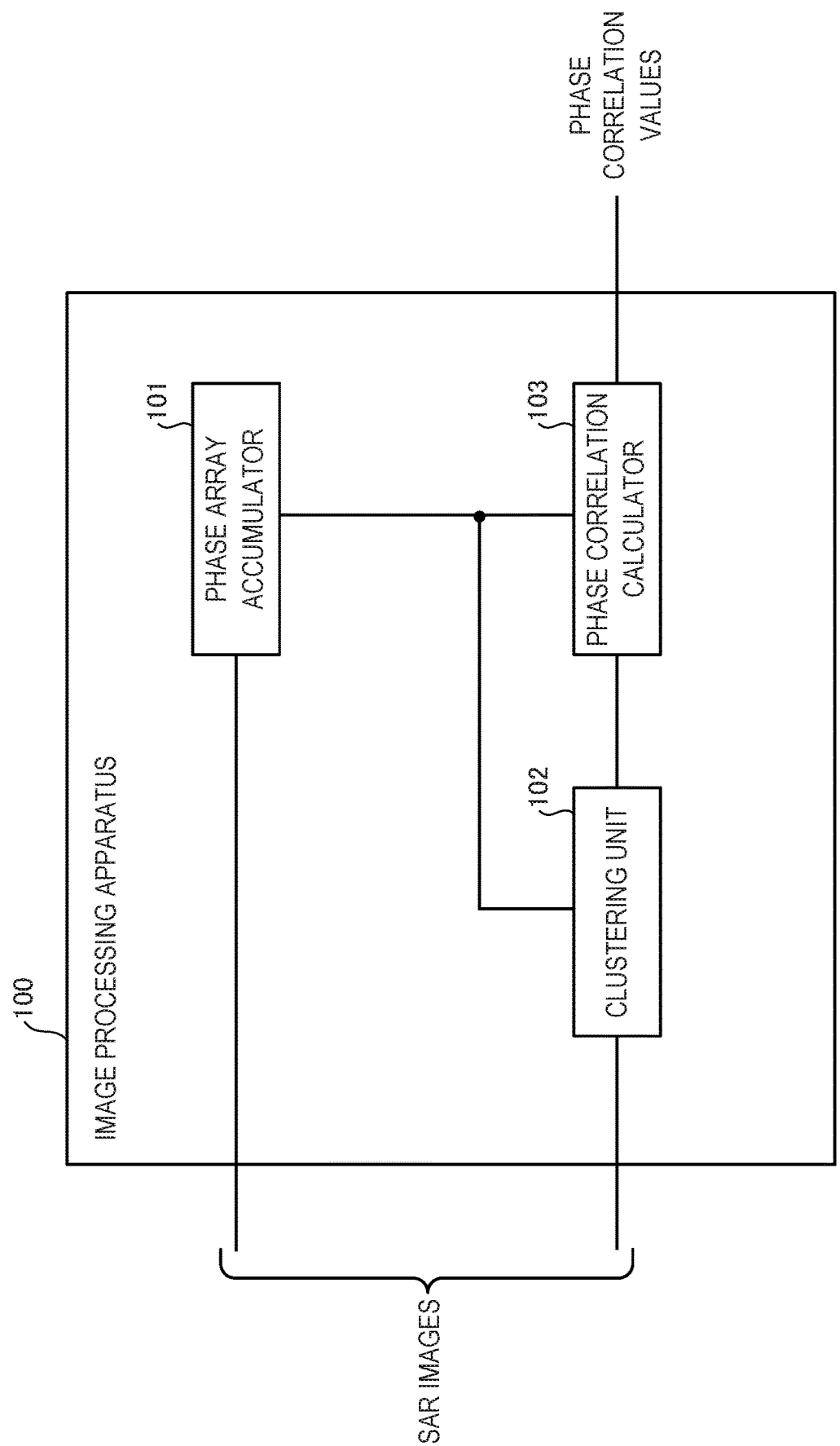
FIG. 1 is a block diagram showing the functional arrangement of an image processing apparatus according to the first example embodiment of the present invention.

As shown in FIG. 1, the image processing apparatus 100 includes a phase array accumulator 101, a clustering unit 102, and a phase correlation calculator 103. The phase array accumulator 101 accumulates the phase arrays of respective pixels over a plurality of images. The clustering unit 102 classifies the respective pixels into a plurality of clusters based on the phase arrays. The phase correlation calculator 103 calculates the correlation between a phase change in each of the plurality of clusters and the phase array of each pixel.

According to this example embodiment, since the correlation between a phase change in each of the plurality of clusters and the phase array of each pixel is calculated, it is possible to generate an evaluation index of a persistent scatterer likelihood without any influence of a large phase change with respect to a target whose displacement is nonlinear, a target whose elevation is high, or a target whose displacement is large.

Second Example Embodiment

An image processing apparatus according to the second example embodiment of the present invention will be described next. To clarify the features of the image processing apparatus according to this example embodiment, an example of a SAR image analysis system will first be described as a technical premise.

<<Explanation of Technical Premise>>

Figure 17:
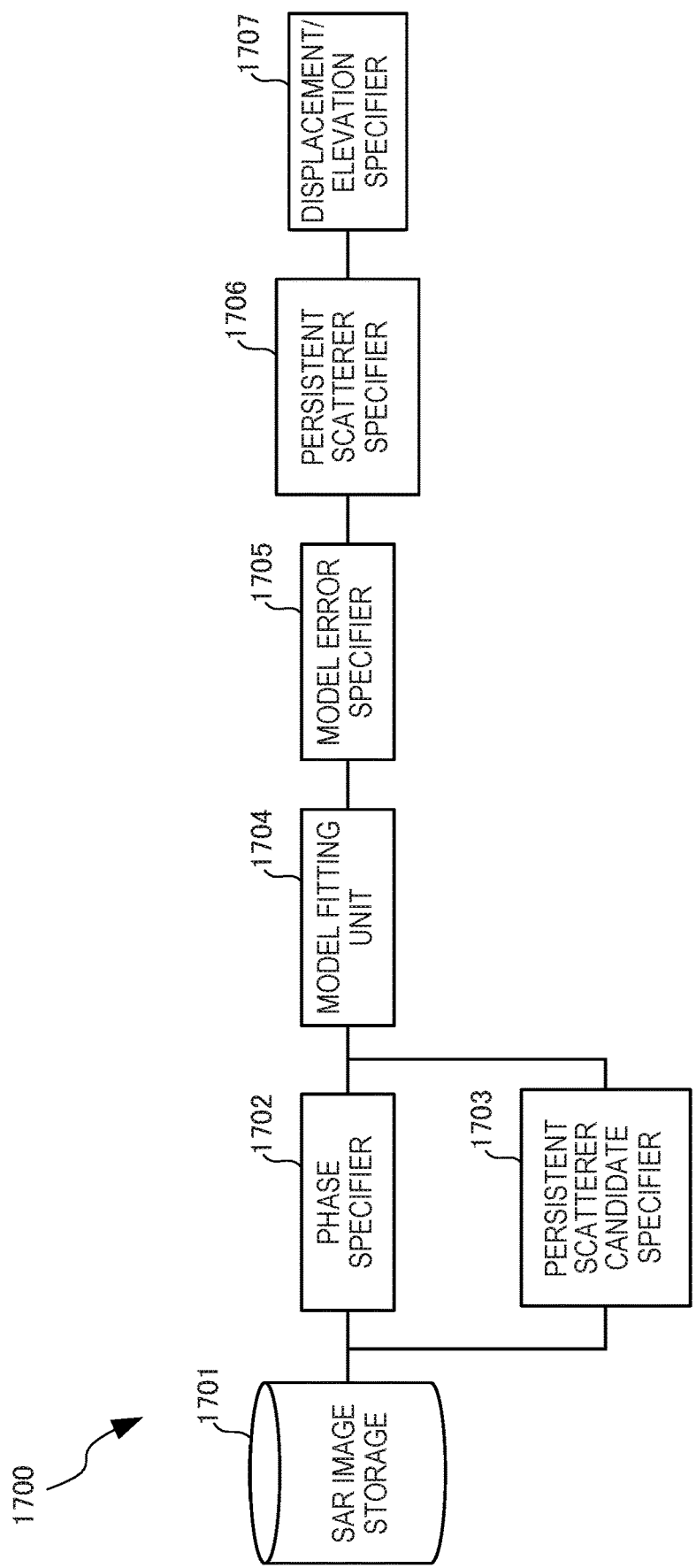
FIG. 17 is a block diagram showing the functional arrangement of a SAR image analysis system according to a technical premise.

FIG. 17 is a block diagram showing the functional arrangement of a SAR image analysis system 1700 according to the technical premise described in patent literature 1.

As shown in FIG. 17, the SAR image analysis system 1700 is formed from a SAR image storage 1701, a phase specifier 1702, a persistent scatterer candidate specifier 1703, a model fitting unit 1704, a model error specifier 1705, a persistent scatterer specifier 1706, and a displacement/elevation specifier 1707.

The SAR image analysis system 1700 having this arrangement operates as follows. First, the phase specifier 1702 receives, from the SAR image storage 1701, a plurality of SAR images obtained by capturing the same place at different times, and specifies a phase change at each pixel. The persistent scatterer candidate specifier 1703 receives the plurality of SAR images obtained by capturing the same place at different times, and specifies persistent scatterer candidates as pixels at which reflection is highly probably stable. As for the persistent scatterer candidates, for example, in patent literature 1, a plurality of SAR images obtained by capturing the same place at different times are input to specify, as persistent scatterer candidates, pixels at which a change in reflection intensity is not large over the plurality of SAR images. Next, the model fitting unit 1704 receives the persistent scatterer candidates specified by the persistent scatterer candidate specifier, and fits a model to a phase observed at each persistent scatterer candidate. The phase on the SAR image is an amount that changes in accordance with an elevation, a displacement, the atmospheric conditions, and the like. That is, the model to be fitted represents how the elevation/displacement of a capturing target, the atmospheric conditions, and the like change with time at which the SAR image is captured. Patent literature 1 assumes a model that is displaced linearly with time. Next, the model error specifier 1705 specifies the amount of the residual from the fitted models as the amount of the error. Patent literature 1 assumes that all phase changes which do not fit to the model are caused by noise which is not caused by an elevation, a displacement, or atmospheric conditions, and that the magnitude of the error from the model represents the magnitude of noise. Then, the persistent scatterer specifier 1706 receives the error specified by the model error specifier, and specifies, as a persistent scatterer, a pixel at which the error is small. Finally, the displacement/elevation specifier 1707 receives the persistent scatterers, and specifies displacements and elevations on the persistent scatterers. Thus, persistent scatterers which are hardly influenced by noise and the precise displacements/elevations at the persistent scatterers are output.

Problem of Technical Premise

However, the SAR image analysis system 1700 cannot perform displacement measurement well with respect to a target whose displacement is nonlinear, a target whose elevation is high, or a target whose displacement is large. The first factor for this problem is that whether reflection is stable is evaluated based on the magnitude of the error from the linear displacement model, and thus an object which is displaced nonlinearly is identified not to be a persistent scatterer. Another factor is that application of a phase is difficult in terms of calculation. The phase is an amount like a position on the circumference of a circle. Even if, for example, the phase is changed for one round or two rounds, if the phase is observed after the change, the phase returns to the origin and thus this cannot be distinguished from a case in which the phase remains unchanged. Therefore, if the phase changes largely, for example, if a displacement is large or an elevation is high, a correct phase change is not recognized and it is thus impossible to fit the model well.

Explanation of this Example Embodiment

To solve the above problem, the image processing apparatus according to this example embodiment receives a plurality of SAR images obtained by capturing the same place at different times, and creates a phase array at each pixel. The image processing apparatus receives the phase arrays, and classifies each pixel into a cluster having a phase synchronized with the phase of the pixel. Then, the image processing apparatus receives a clustering result and the phase arrays at the pixels on the SAR images, and calculates the correlation between a representative phase change of each cluster and a phase change at each pixel on the SAR images. The phase array is an array generated on each pixel for one reference SAR image among the received SAR images, and has, as elements, the phases of pixels, at the same pixel as that of each pixel of one reference SAR image, in the plurality of SAR images obtained by capturing the same place at different times. Each pixel is classified into a pixel cluster having the similar phase change, and it is evaluated whether the phase change at an evaluation target pixel is correlated with the average phase change of the pixel cluster, thereby making it possible to determine how much a persistent scatterer candidate as an evaluation target is not influenced by noise. Since the above process does not include processing of fitting a model, it is possible to specify persistent scatterers with respect to a target such as a high rise building to which a phase model is difficult to be fitted.

<<Functional Arrangement of Image Processing Apparatus>>

Figure 2:
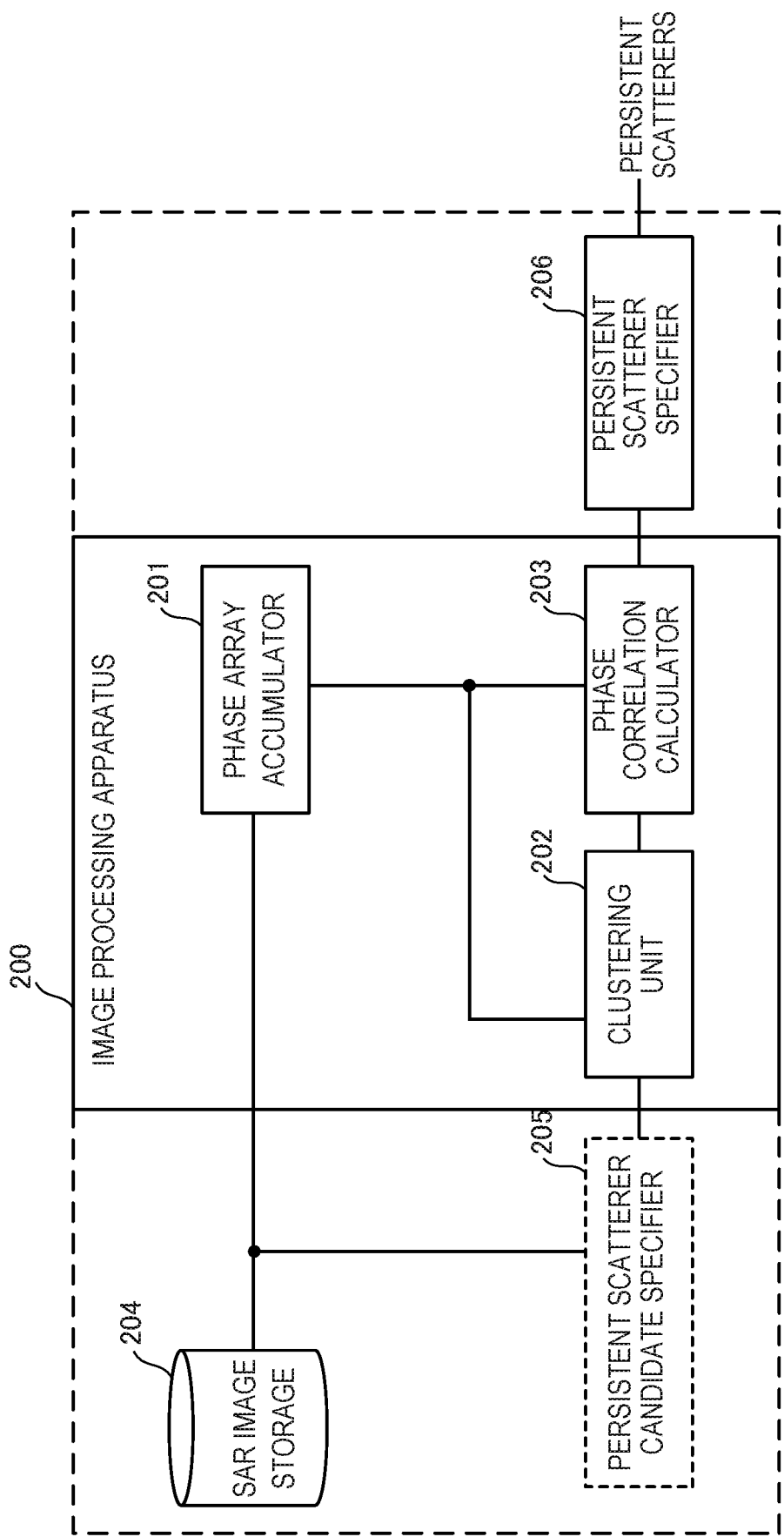
FIG. 2 is a block diagram showing the functional arrangement of an image processing apparatus according to the second example embodiment of the present invention.

FIG. 2 is a block diagram showing the functional arrangement of an image processing apparatus 200 according to this example embodiment.

Referring to FIG. 2, the image processing apparatus 200 according to this example embodiment includes, as a minimum arrangement, a phase array accumulator 201, a clustering unit 202, and a phase correlation calculator 203. The image processing apparatus 200 may include a SAR image storage 204, a persistent scatterer candidate specifier 205, and a persistent scatterer specifier 206.

Based on the plurality of SAR images from the SAR image storage 204, the phase array accumulator 201 accumulates a phase array as an array in which a phase at each pixel of an entire image is recorded. The clustering unit 202 classifies each pixel into a cluster having a similar phase using a clustering method. For example, the method described in non-patent literature 1 may be used as the clustering method. The present invention, however, is not limited to this. The phase correlation calculator 203 calculates the correlation between a representative phase change in each cluster and a phase change at each pixel based on a clustering result and the phase array at each pixel of the entire image.

The persistent scatterer candidate specifier 205 specifies pixels that can be persistent scatterers. If the persistent scatterer candidate specifier 205 is provided, the clustering unit 202 classifies only persistent scatterer candidates. If the persistent scatterer candidate specifier 205 is not provided, the clustering unit 202 classifies the pixels of the entire image. If the persistent scatterer specifier 206 is provided, the persistent scatterer specifier 206 specifies, based on the correlation between each cluster and each pixel calculated by the phase correlation calculator 203, persistent scatterers under a condition that a pixel having a correlation exceeding a predetermined threshold is set as a persistent scatterer.

Subsequently, the respective functional components of the image processing apparatus according to this example embodiment will be described.

(Phase Array Accumulator)

The phase array accumulator 201 accumulates a phase array at each pixel of the entire image. To accumulate the phase array, the phase array accumulator 201 generates, for each pixel, an array having, as an element, the phase at each pixel in the plurality of SAR images. This phase may be obtained as, for example, a phase difference between the reference SAR image and another SAR image. In this case, among the plurality of input SAR images, the reference SAR image is determined in advance. Then, the phase array accumulator 201 obtains the phase differences between the reference SAR image and other SAR images, and accumulates them as a phase array at each pixel. As another example, the phase array accumulator 201 may determine, as a phase array, an array that stores the phases of the plurality of SAR images in time series without setting the reference SAR image. Each phase is stored in, for example, a complex number form normalized so that an absolute value is "1". The phase array accumulator 201 may remove phase changes that depend on the elevation of the target using DEM (Digital Elevation model), or remove phase changes that depend on an atmospheric fluctuation using a known method.

(Clustering Unit)

The clustering unit 202 classifies each pixel of the entire image into a cluster having a similar phase. For example, it is possible to classify each pixel of the entire image into a cluster having a similar phase using the method described in non-patent literature 1.

(Phase Correlation Calculator)

The phase correlation calculator 203 calculates the correlation between the representative phase change of each cluster and the phase array at each pixel of the entire image. The calculated correlation can be used as an evaluation index for determining that as the correlation is stronger, a persistent scatterer likelihood is higher.

<<SAR Image Analysis System>>

Figure 3A:
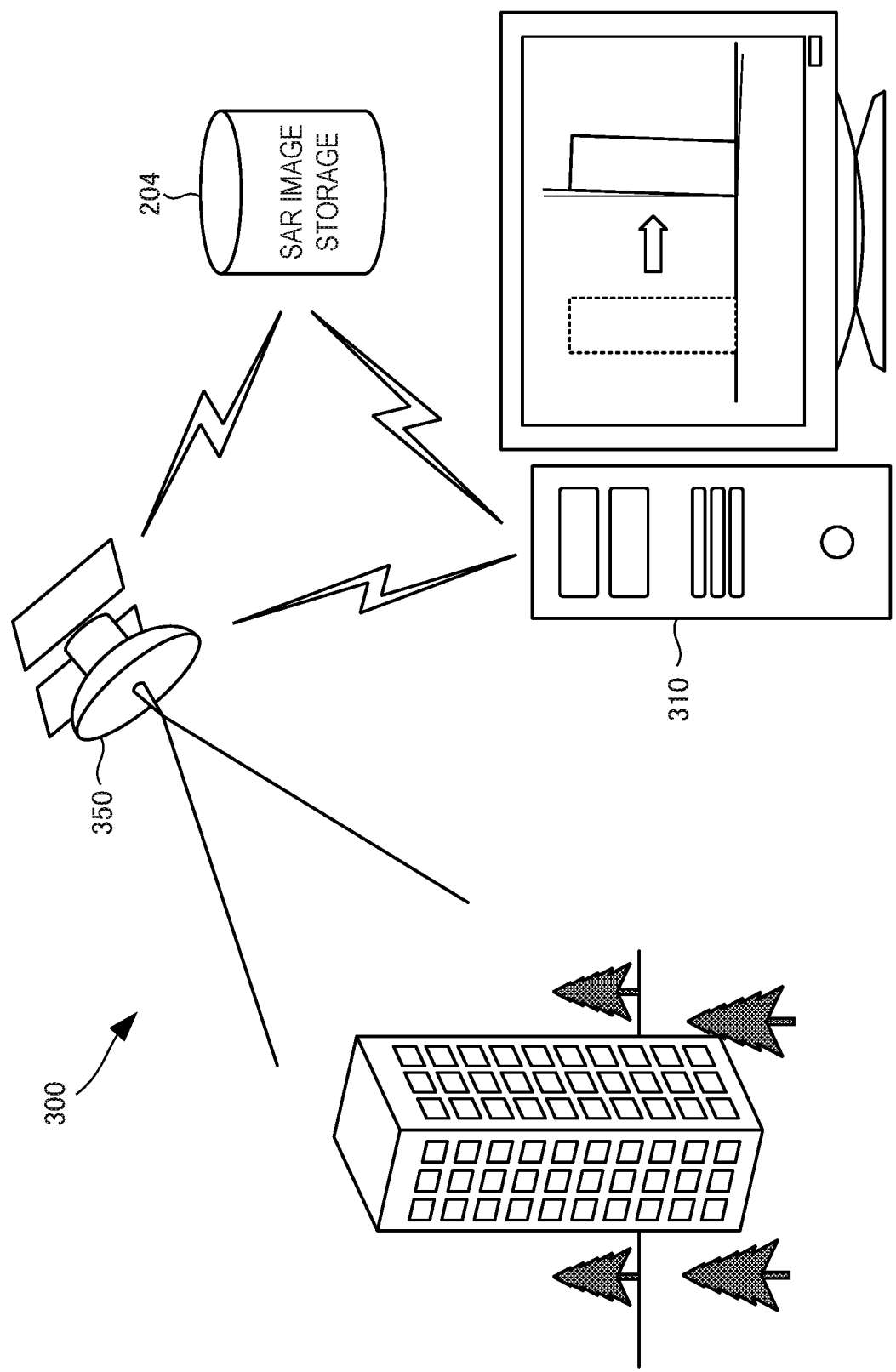
FIG. 3A is a view showing an overview of a SAR image analysis system including the image processing apparatus according to the second example embodiment of the present invention.

FIG. 3A is a view showing an overview of a SAR image analysis system 300 including the image processing apparatus 200 according to this example embodiment.

The SAR image analysis system 300 includes a SAR image analysis apparatus 310 including the image processing apparatus 200, and a SAR satellite 350. The SAR image analysis system 300 determines subsidence of a building caused by the inclination of a structure on the ground such as a high rise building or apartment or ground subsidence by processing SAR images.

The SAR satellite 350 captures SAR images. The SAR satellite 350 captures SAR images of the earth's surface or a structure on the ground such as a high rise building or apartment. The SAR images captured by the SAR satellite 350 are saved in, for example, the SAR image storage 204. In addition, the SAR satellite 350 may transmit the captured SAR images to the SAR image analysis apparatus 310.

The SAR image analysis apparatus 310 acquires the plurality of SAR images captured by the SAR satellite 350. The plurality of SAR images acquired by the SAR image analysis apparatus 310 are, for example, SAR images obtained by capturing the same pixel, same region, same range, or the like of the earth's surface under different image capturing conditions (dates/times, weathers, SAR satellites used for image capturing, and the like). The SAR image analysis apparatus 310 may acquire the SAR images saved in the SAR image storage 204. The SAR image analysis apparatus 310 may directly acquire SAR images from the SAR satellite 350. The SAR image analysis apparatus 310 specifies persistent scatterers from the acquired SAR images. The SAR image analysis apparatus 310 further specifies a phase at each of the specified persistent scatterers.

Figure 3B:
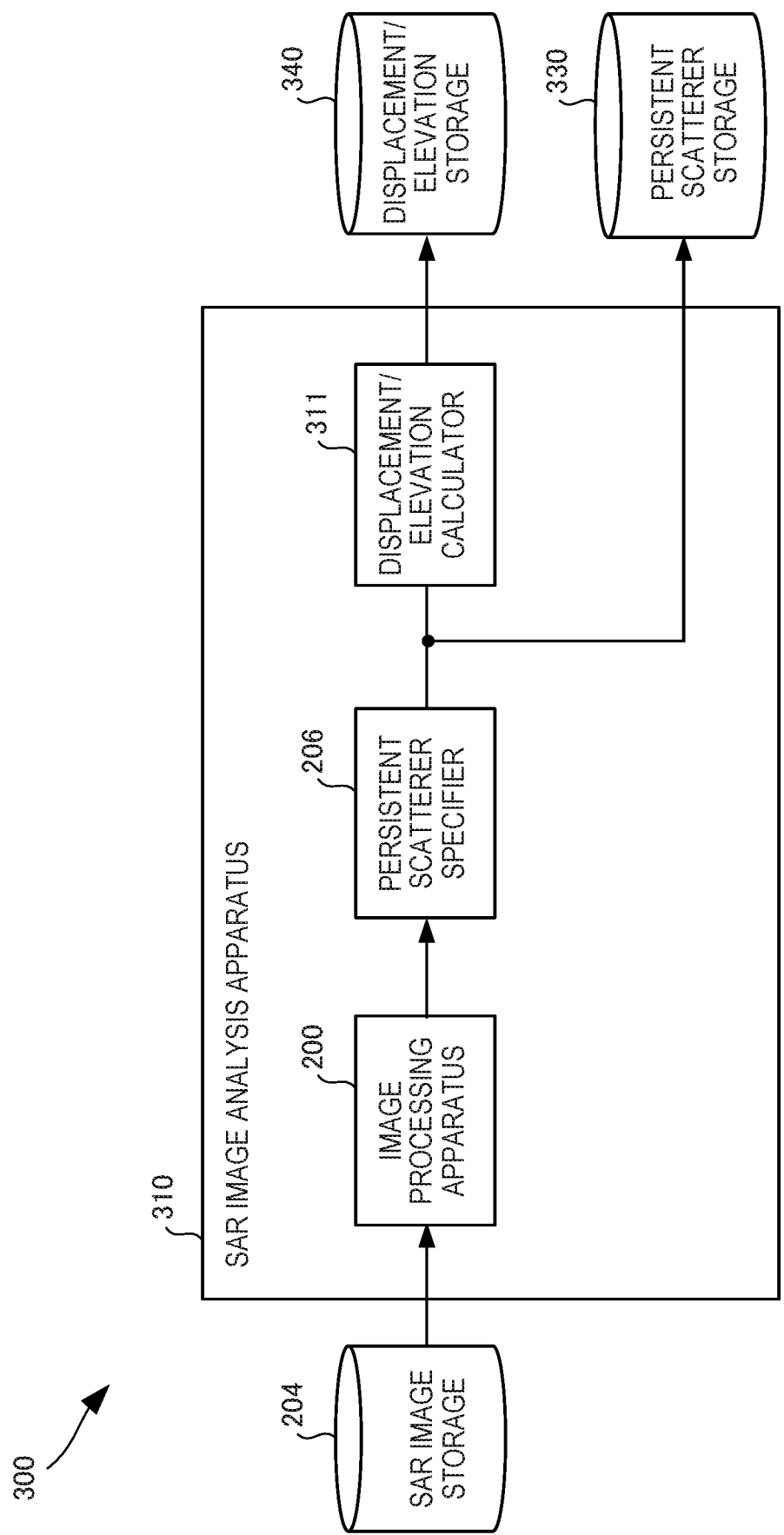
FIG. 3B is a block diagram showing the functional arrangement of the SAR image analysis system including the image processing apparatus according to the second example embodiment of the present invention.

FIG. 3B is a block diagram showing the functional arrangement of the SAR image analysis system 300 including the image processing apparatus 200 according to this example embodiment.

As shown in FIG. 3B, the SAR image analysis system 300 includes the SAR image storage 204, the SAR image analysis apparatus 310, a persistent scatterer storage 330, and a displacement/elevation storage 340. The SAR image analysis apparatus 310 includes the image processing apparatus 200 of this example embodiment, the persistent scatterer specifier 206, and a displacement/elevation calculator 311.

The SAR image analysis apparatus 310 operates as follows. To analyze differences among phases observed at the same pixel over a plurality of SAR images, the image processing apparatus 200 according to this example embodiment acquires, from the SAR image storage 204, a plurality of SAR images obtained by capturing the same place at different times. The image processing apparatus 200 according to this example embodiment generates, as an evaluation index of a persistent scatterer likelihood, the correlation between the representative phase change of the cluster into which each pixel is classified and the phase array of each pixel. The persistent scatterer specifier 206 specifies persistent scatterers based on acquired evaluation indices. The specified persistent scatterers are stored in, for example, the persistent scatterer storage 330.

Next, the displacement/elevation calculator 311 receives the persistent scatterers specified by the persistent scatterer specifier 206, and calculates the displacement and elevation at each persistent scatterer. The calculated displacement and elevation are stored in, for example, the displacement/elevation storage 340.

(Phase Correlation Calculator)

Figure 4:
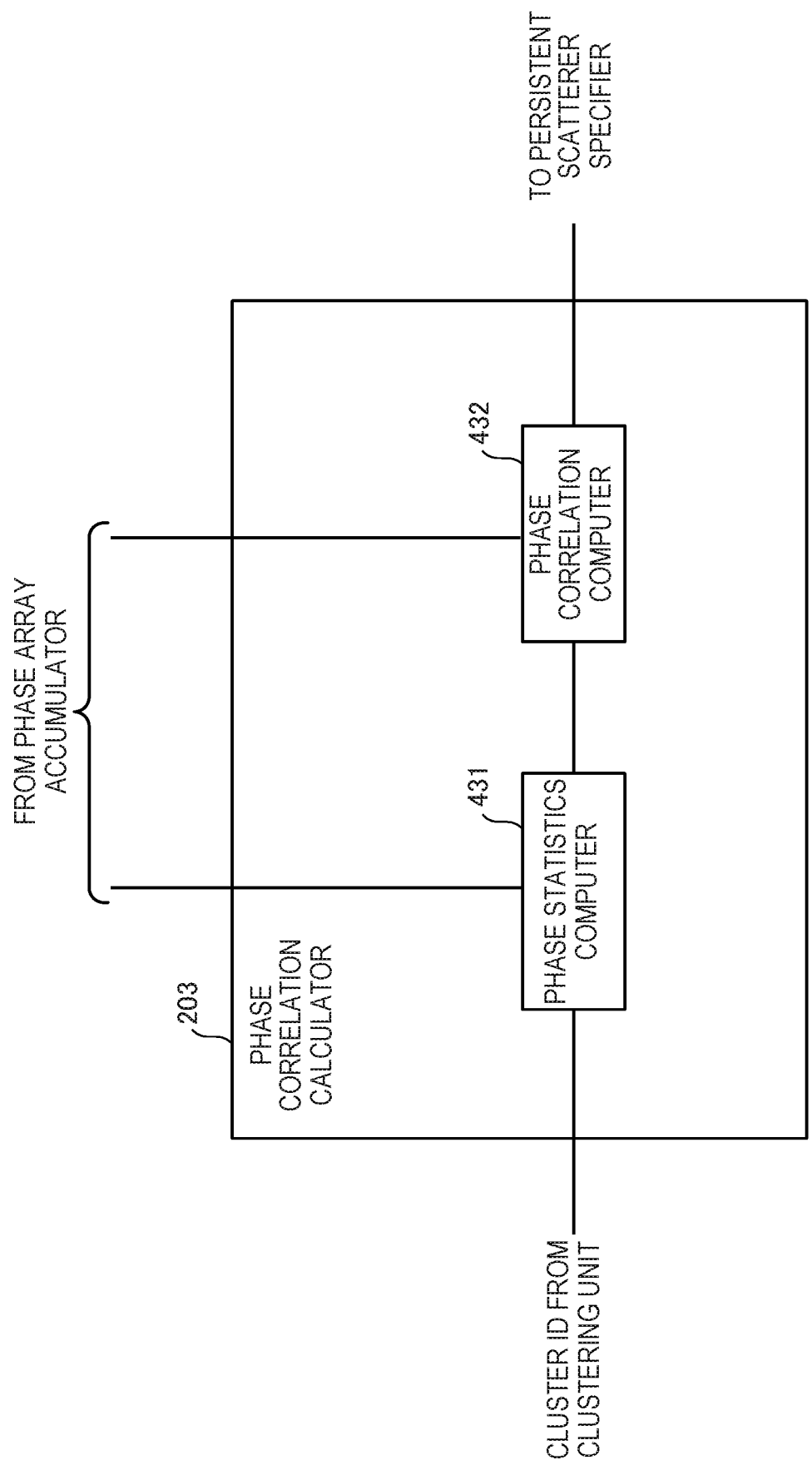
FIG. 4 is a block diagram showing the functional arrangement of a phase correlation calculator according to the second example embodiment of the present invention.

FIG. 4 is a block diagram showing the functional arrangement of the phase correlation calculator 203 according to this example embodiment.

Referring to FIG. 4, the phase correlation calculator 203 includes a phase statistics computer 431 and a phase correlation computer 432.

(Phase Statistics Computer)

The phase statistics computer 431 specifies, for each cluster, a statistics indicating the representative phase change of each cluster. As the statistics indicating the representative phase change of each cluster, for example, the average of the phase arrays at pixels forming the cluster is used. Alternatively, the weighted mean of the phase arrays may be specified as the representative phase change of each cluster using a weighting function that changes in accordance with a distance. That is, when i represents a pixel for which a correlation is to be specified, C represents a cluster, w(d) represents a monotonically nonincreasing positive function with respect to a positive input d, $r_i$ represents the position vector of each pixel, and $s_i$ represents a complex column vector storing the elements of the phase array, a vector $s_C(r)$ indicating the representative phase change of the cluster C at a place r is specified by:

$$s_C(r) = \frac{\Sigma_{i \in C} w(|r - r_i|) s_i}{\Sigma_{i \in C} w(|r - r_i|)} \quad (1)$$

Furthermore, for the phase array of each of the pixels forming the cluster, a matrix having, as elements, phase differences for all pairs of elements of the phase array may be calculated, and the average value of the calculated matrices may be calculated and then used as the statistics indicating the representative phase change of each cluster. If, for example, the matrix recording the phase differences for all the pairs of elements of the phase array is obtained for a pixel i, the matrix can be obtained as $s_i s_i^*$ using the column vector $s_i$ storing the elements of the phase array at the pixel i. Note that * is a symbol indicating a complex conjugate transposition. If the statistics indicating the representative phase change of each cluster is specified for the cluster C, the average value of the matrix $s_i s_i^*$ obtained for the respective pixel i forming the cluster C is used as the statistics.

Similar to the definition of equation (1), the weighted mean of the matrix $s_i s_i^*$ may be set as the statistics indicating the representative phase change of each cluster. That is, using a character definition similar to that used to define $S_C(r)$, the statistics indicating the representative phase change of the cluster is specified in the form of the weighted mean $S_C(r)$ of the matrix, given by:

$$S_C(r) = \frac{\Sigma_{i \in C} w(|r - r_i|) s_i s_i^*}{\Sigma_{i \in C} w(|r - r_i|)} \quad (2)$$

To specify the representative phase change of the cluster, another statistics such as a mode or a median may be obtained, instead of the average value of the matrices or vectors. A complex statistics is directly calculated for the complex vectors or matrices. However, a polar angle may be extracted, and a statistics for the polar angle may be specified, thereby returning it to a complex number. In average calculation, the absolute value of each element of the obtained matrix or vector generally does not become "1" but normalization may be performed so that the absolute value is "1".

(Phase Correlation Computer)

The phase correlation computer 432 computes the correlation between the representative phase change of the cluster and a phase change at each pixel of the entire image. For a pixel having a stronger correlation, it can be evaluated that noise is less and a persistent scatterer likelihood is higher. To compute the correlation, for example, the following calculation operation is performed for each pixel of the entire image. Assume that i represents the index of a pixel for which a correlation is specified, $s_i$ represents a column vector storing the elements of a phase array at the pixel i, and $r_i$ represents the position vector of the pixel i. Assume also that the vector $s_C(r)$ defined by equation (1) is used as the statistics indicating the representative phase change of the cluster C. At this time, the phase correlation computer 432 specifies a correlation corr(i, C) between the representative phase change of the cluster C and the phase change at the pixel i for each of all the pixels i of the entire image by:

$$corr(i, C) = \left| \frac{s_i^* s_C(r_i)}{\|s_i\| \|s_C(r_i)\|} \right| \quad (3)$$

If the matrix $S_C(r)$ defined by equation (2) is used as the statistics indicating the representative phase change of the cluster C, the phase correlation computer 432 specifies the correlation corr(i, C) between the representative phase change of the cluster C and the phase change at the pixel i for each of all the pixels i of the entire image by:

$$corr(i, C) = \frac{s_i^* S_C(r_i) s_i}{v_{one}^* S_C(r_i) v_{one}} \quad (4)$$

where $v_{one}$ represents a column vector with all elements of 1.

As the correlation, a result of appropriately fitting, to the value specified by equation (4), conversion by a monotonically nondecreasing function with respect to a positive input, such as a square root or a square, may be used.

The thus calculated correlation between the representative phase change of each cluster and the phase change at each pixel of the entire image is stronger as the noise amount at each pixel is smaller, and is thus useful to specify a persistent scatterer as a pixel with little noise. That is, for a pixel having a higher correlation, it can be determined that a persistent scatterer likelihood is higher. Note that correlations between the representative phase changes of the clusters and the phase change at each pixel of the entire image as many as the number of clusters are obtained for each pixel of the entire image.

To use these correlations to specify whether each pixel of the entire image is a persistent scatterer, the phase correlation computer 432 integrates the correlations specified for each pixel with the plurality of clusters into one value, and outputs it as a correlation at each pixel. This processing is implemented by, for example, specifying, for each pixel of the entire image, a cluster including the pixel, and using only the correlation with the representative phase change of the cluster. Alternatively, for each pixel of the entire image, the highest one of the plurality of correlations specified with the respective clusters may be extracted and used. Alternatively, for each pixel of the entire image, the closest cluster may be specified, and only the correlation with the representative phase change of the cluster may be used.

<<Storage Structure of Each Data>>

The storage structures of respective data used in this example embodiment will be described below with reference to FIGS. 5A to 5G. Note that for the sake of convenience, separated storage structures shown in FIGS. 5A to 5G will be described. However, the plurality of storage structures may be integrated or may further be divided.

(SAR Image Storage)

Figure 5A:
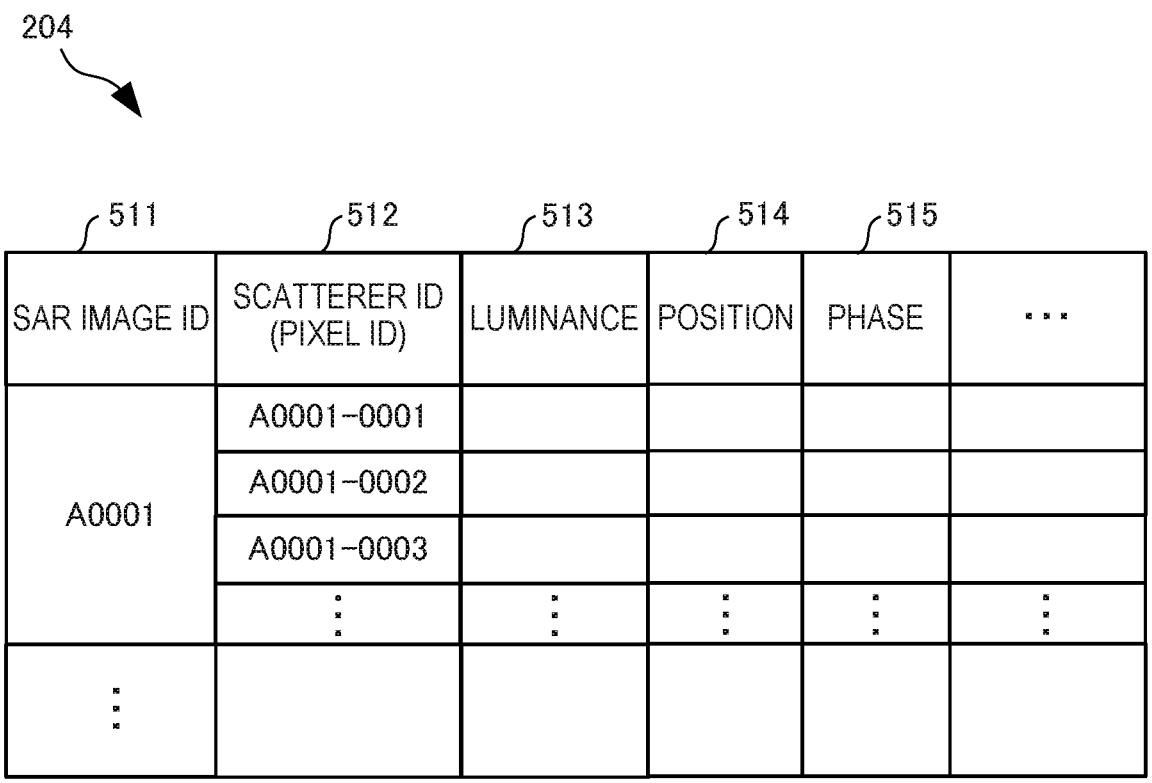
FIG. 5A is a table showing the structure of a SAR image storage according to the second example embodiment of the present invention.

FIG. 5A is a table showing the structure of the SAR image storage 204 according to this example embodiment. The SAR image storage 204 accumulates SAR images captured by a satellite or the like and transmitted. Note that the structure of the SAR image storage 204 is not limited to that shown in FIG. 5A.

The SAR image storage 204 stores a scatterer ID (image ID) 512 included in a SAR image of each SAR image ID 511. The SAR image storage 204 stores a luminance 513, a position 514, a phase 515, and the like in association with each scatterer ID (image ID) 512.

(Phase Array Accumulator)

Figure 5B:
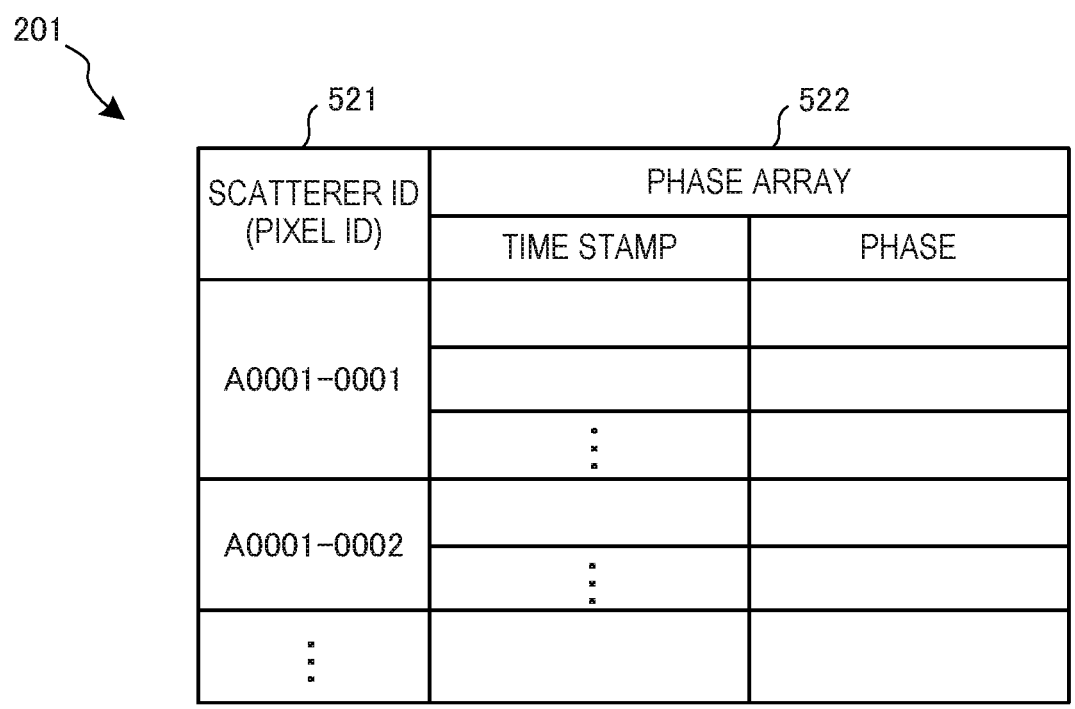
FIG. 5B is a table showing the structure of a phase array accumulator according to the second example embodiment of the present invention.

FIG. 5B is a table showing the structure of the phase array accumulator 201 according to this example embodiment. The phase array accumulator 201 accumulates a phase array of each scatterer (pixel) included in the SAR images over the plurality of SAR images. Note that the structure of the phase array accumulator 201 is not limited to that shown in FIG. 5B. The phase array accumulator 201 may be implemented as a phase array generator that calls, from the SAR image storage 204, the phase array of each scatterer (pixel) over the plurality of SAR images.

The phase array accumulator 201 stores, in association with each scatterer ID (pixel ID) 521, a phase array 522 formed from a set of the phase and the time stamp of each SAR image.

(Persistent Scatterer Candidate Table)

FIG. 5C is a table showing the structure of a persistent scatterer candidate table 530 according to this example embodiment. The persistent scatterer candidate table 530 is used by the persistent scatterer candidate specifier 205 to specify persistent scatterer candidates among scatterers (pixels) in the plurality of SAR images. Note that the structure of the persistent scatterer candidate table 530 is not limited to that shown in FIG. 5C.

The persistent scatterer candidate table 530 stores, in association with each scatterer ID (pixel ID) 531, a persistent scatterer candidate condition 532 for specifying a persistent scatterer candidate and a persistent scatterer candidate flag 533 of a determination result by the persistent scatterer candidate condition 532. Assume that if the persistent scatterer candidate flag 533 is "1", this indicates that the scatterer is a persistent scatterer candidate, and if the persistent scatterer candidate flag 533 is "0", this indicates that the scatterer is not a persistent scatterer candidate. The persistent scatterer candidate condition 532 includes luminance stability, position stability, and phase stability but determination is performed under at least one condition which is not limited to the above conditions.

(Cluster Table)

FIG. 5D is a table showing the structure of a cluster table 540 according to this example embodiment. The cluster table 540 is used by the clustering unit 202 to classify the scatterers (pixels) based on the phase arrays. Note that the structure of the cluster table 540 is not limited to that shown in FIG. 5D.

The cluster table 540 stores, in association with a cluster ID 541, a scatterer ID (pixel ID) 542 classified into the cluster, a phase array 543, and a persistent scatterer candidate flag 544. If only persistent scatterer candidates are classified, the scatterers (pixels) each having the persistent scatterer candidate flag 544 of "1" are classified.

(Phase Statistics Table)

FIG. 5E is a table showing the structure of a phase statistics table 550 according to this example embodiment. The phase statistics table 550 is used by the phase statistics computer 431 to compute a representative phase change of each cluster. Note that the structure of the phase statistics table 550 is not limited to that shown in FIG. 5E.

The phase statistics table 550 stores, in association with a cluster ID 551, a scatterer ID (pixel ID) 552 classified into each cluster, and a phase array 553. The phase statistics table 550 then stores a phase statistics 554 of each cluster calculated based on a plurality of scatterers (pixels) classified into each cluster. The phase statistics 554 stores, for example, the average of the phase arrays, the weighted mean of the phase arrays, or the like as a phase change.

(Phase Correlation Table)

Figure 5F:
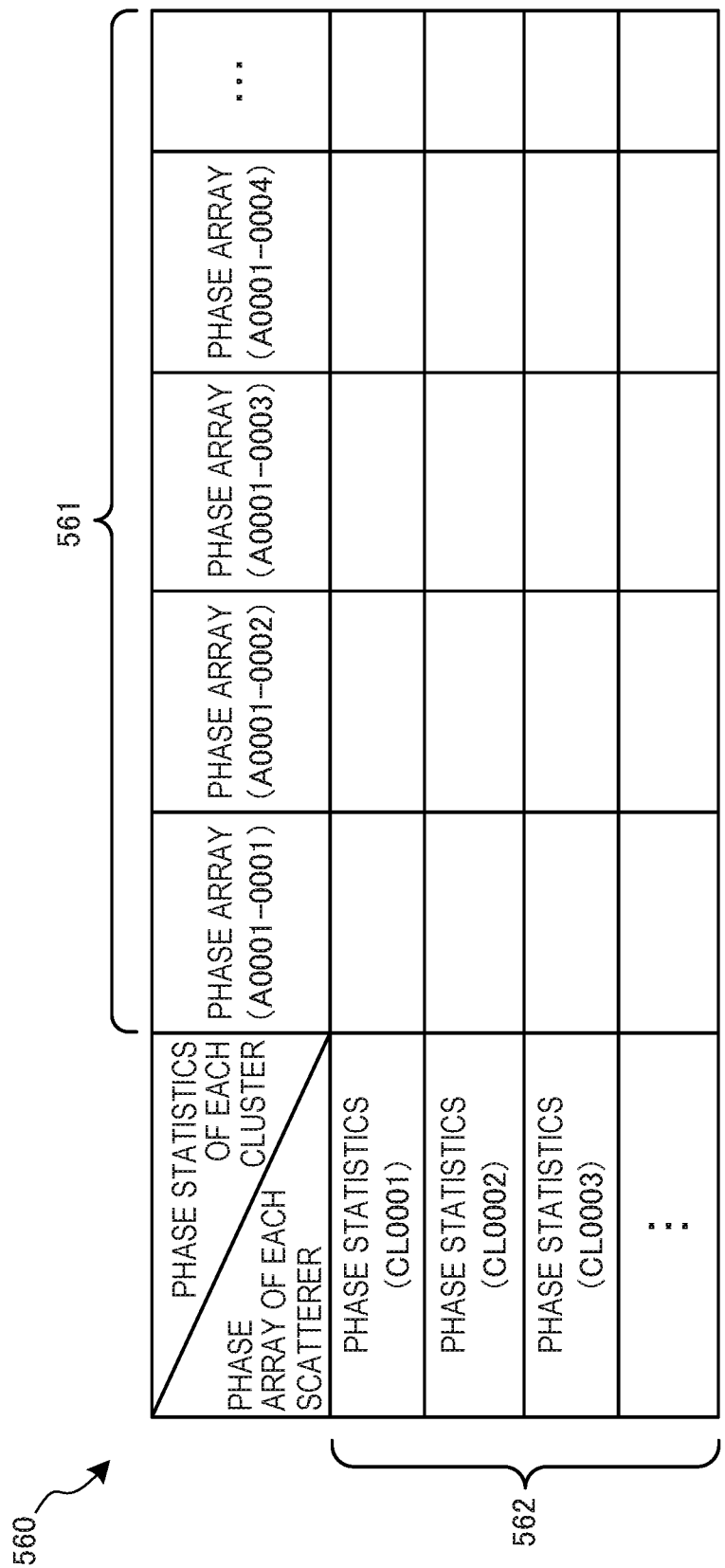
FIG. 5F is a table showing the structure of a phase correlation table according to the second example embodiment of the present invention.

FIG. 5F is a table showing the structure of a phase correlation table 560 according to this example embodiment. The phase correlation table 560 is used by the phase correlation computer 432 to compute the correlation between the phase array of each scatterer (pixel) and the phase statistics (phase change) of each cluster. Note that the structure of the phase correlation table 560 is not limited to that shown in FIG. 5F.

The phase correlation table 560 stores the calculated phase correlation values of all sets between a phase array cluster 561 of the scatterers (pixels) and a phase statistics (phase change) cluster 562 of the respective clusters.

(Persistent Scatterer Table)

FIG. 5G is a table showing the structure of a persistent scatterer table 570 according to this example embodiment. The persistent scatterer table 570 is used by the persistent scatterer specifier 206 to specify a persistent scatterer based on the phase correlation value from the phase correlation calculator 203. Note that the structure of the persistent scatterer table 570 is not limited to that shown in FIG. 5G.

The persistent scatterer table 570 stores, in association with each scatterer ID (pixel ID) 571, a persistent scatterer candidate flag 572, a phase correlation calculation result 573, and a persistent scatterer flag 574. If the persistent scatterer flag 574 is "1", this indicates that the scatterer is a persistent scatterer, and if the persistent scatterer flag 574 is "0", this indicates that the scatterer is not a persistent scatterer.

<<Hardware Arrangement of Image Processing Apparatus>>

Figure 6:
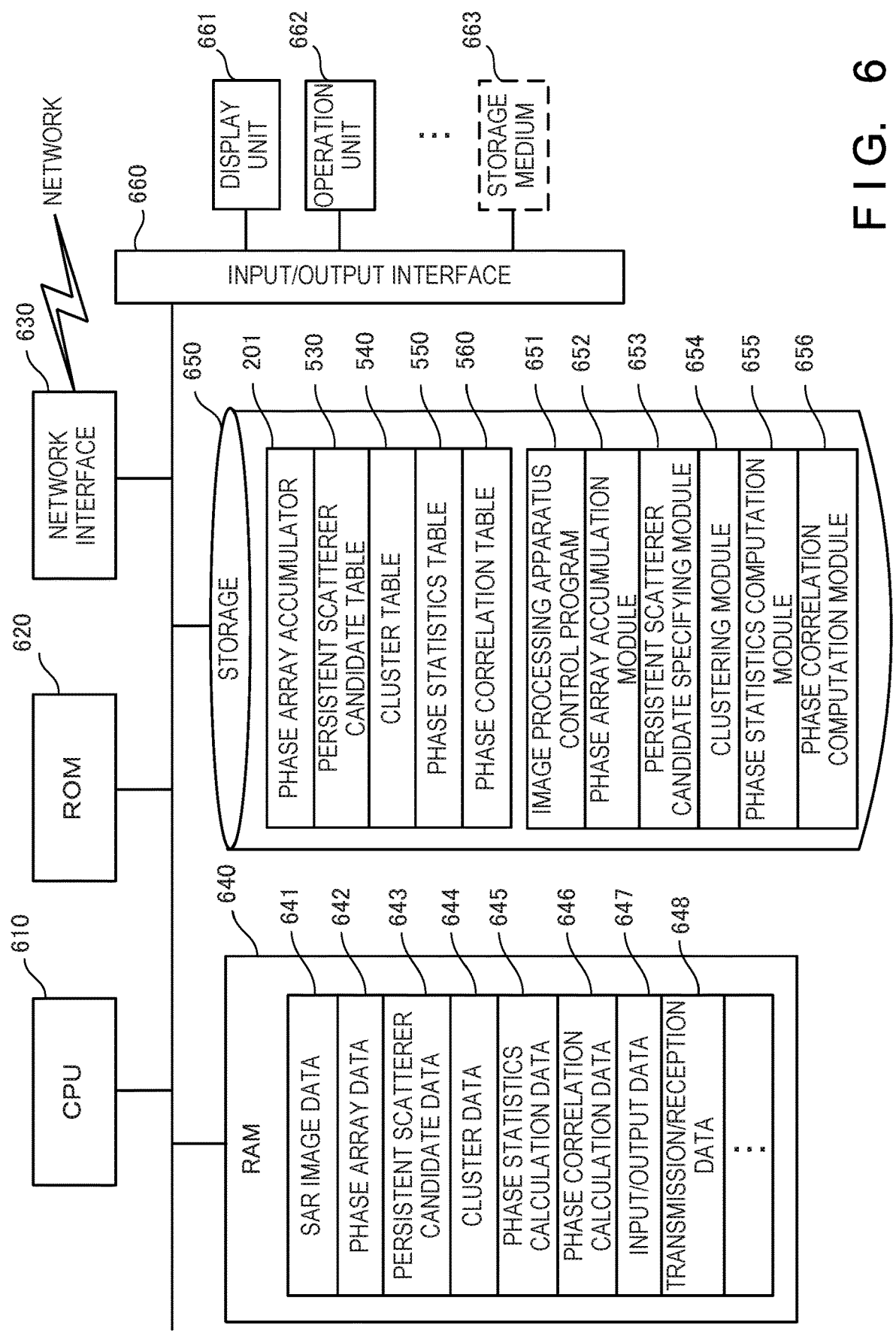
FIG. 6 is a block diagram showing the hardware arrangement of the image processing apparatus according to the second example embodiment of the present invention.

FIG. 6 is a block diagram showing the hardware arrangement of the image processing apparatus 200 according to this example embodiment. Note that FIG. 6 shows an arrangement including the persistent scatterer candidate specifier 205 without the persistent scatterer specifier 206. The present invention, however, is not limited to this.

Referring to FIG. 6, a CPU (Central Processing Unit) 610 is an arithmetic control processor, and implements the functional components shown in FIGS. 2 and 4 by executing a program. Note that a plurality of CPUs 610 may be provided in correspondence with the respective functions. A ROM (Read Only Memory) 620 stores permanent data such as initial data and a program, and programs. A network interface 630 controls communication with another apparatus such as the SAR image storage 204 via a network.

A RAM (Random Access Memory) 640 is a random access memory used as a temporary storage work area by the CPU 610. An area to store data necessary for implementation of this example embodiment is allocated to the RAM 640. SAR image data 641 is data of a SAR image acquired from the SAR image storage 204. Phase array data 642 is data of the phase array of each scatterer (pixel) acquired from the phase array accumulator 201. Persistent scatterer candidate data 643 is data of a persistent scatterer candidate of each scatterer (pixel) acquired from the persistent scatterer candidate table 530. Cluster data 644 is data of a cluster, into which each scatterer (pixel) is classified, acquired from the cluster table 540. Phase statistics calculation data 645 is data of the phase statistics of each cluster acquired from the phase statistics table 550. Phase correlation calculation data 646 is data of the correlation, acquired from the phase correlation table 560, between the phase array of each scatterer (pixel) and the phase statistics (phase change) of each cluster. Input/output data 647 is data input/output to/from an input/output device via the input/output interface 660. Transmission/reception data 648 is data transmitted/received to/from another apparatus via the network interface 630.

A storage 650 stores a database, various parameters, or the following data or programs necessary for implementation of this example embodiment. The phase array accumulator 201 accumulates the phase array of each scatterer (pixel), as shown in FIG. 5B. The persistent scatterer candidate table 530 stores data indicating whether each scatterer (pixel) is a persistent scatterer candidate, as shown in FIG. 5C. The cluster table 540 stores scatterers (pixels) classified into each cluster, as shown in FIG. 5D. The phase statistics table 550 stores the phase statistics (phase change) of each cluster, as shown in FIG. 5E. The phase correlation table 560 stores the correlation between the phase array of each scatterer (pixel) and the phase statistics (phase change) of each cluster, as shown in FIG. 5F.

The storage 650 stores the following programs. An image processing apparatus control program 651 is a program that controls the overall processing of the image processing apparatus 200 according to this example embodiment. A phase array accumulation module 652 is a module that accumulates the phase arrays of scatterers (pixels) over the plurality of SAR images. A persistent scatterer candidate specifying module 653 is a module that specifies a persistent scatterer candidate based on the stability of data of each scatterer (pixel). A clustering module 654 is a module that classifies the respective scatterers (pixels) into a plurality of clusters based on the phase arrays of the scatterers (pixels). A phase statistics computation module 655 is a module that computes the representative phase feature (phase change) of each cluster. A phase correlation computation module 656 is a module that computes the correlation between the phase array of each scatterer (pixel) and the phase statistics (phase change) of each cluster.

An input/output interface 660 performs interface to control data input/output to/from the input/output device. In this example embodiment, a display unit 661 that displays the state of the image processing apparatus 200 and an operation unit 662 that is used to perform an operation input to the image processing apparatus 200 are connected to the input/output interface 660. A storage medium 663 storing SAR images may also be connected to the input/output interface 660.

Note that programs and data that are associated with the general-purpose functions of the image processing apparatus 200 and other feasible functions are not shown in the RAM 640 or the storage 650 of FIG. 6.

<<Processing Procedure of Image Processing Apparatus>>

FIG. 7 is a flowchart illustrating the processing procedure of the image processing apparatus 200 according to this example embodiment. This flowchart is executed by the CPU 610 shown in FIG. 6 using the RAM 640, thereby implementing the functional components shown in FIGS. 2 and 4.

In step S701, the image processing apparatus 200 generates a phase array of each scatterer (pixel) from the plurality of SAR images, and accumulates it. In step S703, the image processing apparatus 200 classifies the respective scatterers (pixels) of the SAR images into a plurality of clusters based on the phase arrays. In step S705, the image processing apparatus 200 calculates a statistics indicating the representative phase change of each cluster from the phase arrays of the scatterers (pixels) in each cluster. In step S707, the image processing apparatus 200 calculates the correlation between the statistics indicating the representative phase change of each cluster and the phase array of each scatterer (pixel) of the entire image. In step S709, the image processing apparatus 200 outputs the calculated correlations intact, or integrates and outputs the calculated correlations. A scatterer (pixel) with a stronger correlation is more hardly influenced by noise, and can be determined to be more likely a persistent scatterer appropriate for displacement analysis. Thus, the correlation becomes a stable evaluation index.

According to this example embodiment, the correlation between the phase change in each of the plurality of clusters and the phase array at each pixel is used to evaluate a persistent scatterer. Therefore, it is possible to evaluate a persistent scatterer likelihood without any influence of a large phase change with respect to a target whose displacement is nonlinear, a target whose elevation is high, or a target whose displacement is large.

That is, according to this example embodiment, it is possible to specify persistent scatterers necessary for displacement analysis with respect to a target whose displacement is nonlinear, a target whose elevation is high, or a target whose displacement is large. This is because, for each pixel of the entire image, it is unnecessary to assume a displacement that occurs linearly with time, or to fit a model. In this example embodiment, each pixel is classified into a cluster having a similar phase change, and a statistics indicating the representative phase change of each cluster is calculated. This obtains, for each cluster, a phase change from which the influence of noise has been removed. By calculating, for each pixel of the entire image, the correlation with the representative phase change of each cluster, it can be found how much the phase change including noise at each pixel of the entire image and the phase change without noise in each cluster are correlated. It is, therefore, possible to specify that a pixel with a strong correlation is a persistent scatterer with little noise.

Third Example Embodiment

An image processing apparatus according to the third example embodiment of the present invention will be described next. The image processing apparatus according to this example embodiment is different from that according to the above-described second example embodiment in that a noise remover that removes noise from a calculated phase statistics is provided. The remaining components and operations are similar to those in the second example embodiment. Hence, the same reference numerals denote the similar components and operations, and a detailed description thereof will be omitted.

(Phase Correlation Calculator)

Figure 8:
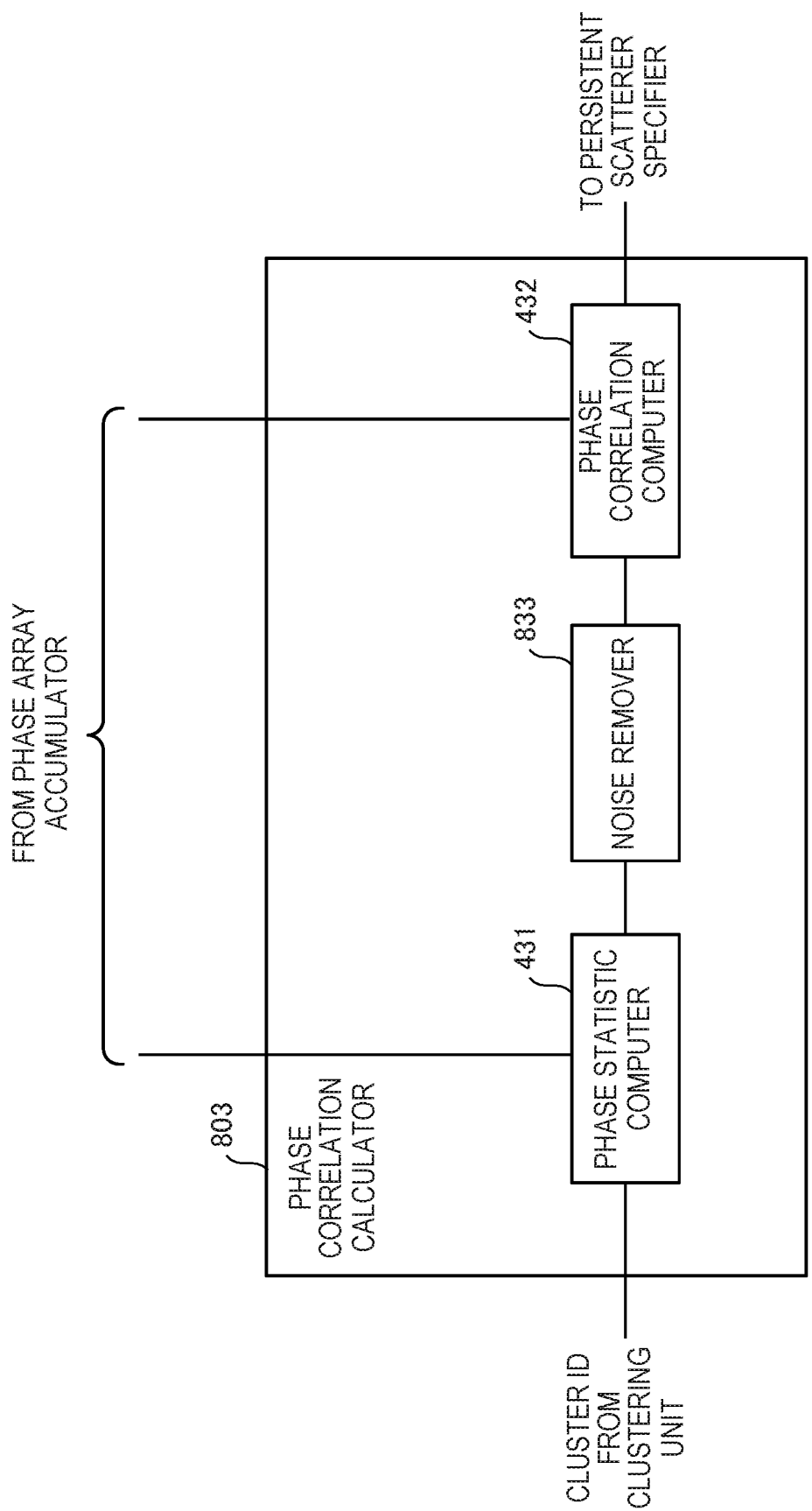
FIG. 8 is a block diagram showing the functional arrangement of a phase correlation calculator according to the third example embodiment of the present invention.

FIG. 8 is a block diagram showing the functional arrangement of a phase correlation calculator 803 of an image processing apparatus 800 according to this example embodiment. Note that the arrangement of the image processing apparatus 800 is obtained by replacing the phase correlation calculator 203 shown in FIG. 2 by the phase correlation calculator 803.

The phase correlation calculator 803 according to this example embodiment includes a phase statistics computer 431, a noise remover 833, and a phase correlation computer 432. That is, the phase correlation calculator 803 according to this example embodiment is different from the phase statistics computer 203 according to the second example embodiment in that the noise remover 833 is provided between the phase statistics computer 431 and the phase correlation computer 432.

The phase statistics computer 431 calculates a statistics indicating the representative phase change of a cluster. The noise remover 833 removes the influence of noise from the statistics calculated by the phase statistics computer 431. The phase correlation computer 432 calculates the correlation with each scatterer (pixel) using the statistics from which the influence of noise has been removed by the noise remover 833.

(Noise Remover)

Subsequently, the noise remover 833 will be described in detail. The noise remover 833 removes the influence of noise from the statistics concerning the representative phase change of the cluster calculated by the phase statistics computer 431. When the phase statistics computer 431 calculates the statistics concerning the representative phase change of each cluster, the influence of noise is removed to some extent. In this example embodiment, it is possible to increase robustness against noise by removing, using prior knowledge about a phase array that can be specified for each pixel in each cluster, data that does not match the prior knowledge.

As the prior knowledge to remove the influence of noise, for example, knowledge that a phase change at each pixel in each cluster is obtained by adding noise to one type of phase change representing each cluster is used. According to the prior knowledge, it is apparent that a matrix $S_C(r)$ as a statistics calculated by equation (2) has a characteristic of being divided into one eigenvector corresponding to the representative phase change of the cluster and the remaining eigenvectors corresponding to noise by eigenvalue decomposition. Therefore, for example, the matrix $S_C(r)$ as a phase feature calculated by equation (2) undergoes eigenvalue decomposition. Then, a maximum eigenvector is set as an eigenvector corresponding to the representative phase change of the cluster, and the remaining eigenvectors are caused by noise. By separating the matrix $S_C(r)$ into a matrix corresponding to the maximum eigenvector and a matrix corresponding to the remaining eigenvectors, it is possible to obtain the statistics from which the influence of noise has been removed.

Prior knowledge that a small change which is not caused by noise is included between the representative phase change of the cluster and the phase change at each pixel of each cluster may be used. According to the prior knowledge, it is apparent that the matrix $S_C(r)$ as the statistics specified by equation (2) has a characteristic of being divided into several eigenvectors corresponding to the representative phase change of the cluster and the remaining eigenvectors corresponding to noise by eigenvalue decomposition. Therefore, for example, the matrix $S_C(r)$ as a phase feature calculated by equation (2) undergoes eigenvalue decomposition. Then, several eigenvectors having large eigenvalues are set as eigenvectors corresponding to the representative phase change of the cluster and the remaining eigenvectors are caused by noise. By separating the matrix $S_C(r)$ into a matrix corresponding to the several eigenvectors having large eigenvalues and a matrix corresponding to the remaining eigenvectors, it is possible to obtain the statistics from which the influence of noise has been removed.

The influence of noise may be removed by assuming a model in which a displacement is slow with time. In this case, on the matrix $S_C(r)$ as the statistics calculated by equation (2), an absolute value is large with respect to a component for which the phases of the elements of phase arrays corresponding to images whose image capturing times as image acquisition times are close to each other are compared to each other. On the other hand, an absolute value is small with respect to a component for which the phases of the elements of phase arrays corresponding to images whose image capturing times are separated from each other are compared to each other. With respect to noise, however, components of the matrix $S_C(r)$ except for diagonal components have a characteristic of increasing an absolute value regardless of whether the times are separated from each other. As described above, the influence of noise can be removed by maintaining the components of the matrix $S_C(r)$ corresponding to phase comparison between the images whose image capturing times are close to each other and forcibly making, close to "0 (zero)", the component of the matrix $S_C(r)$ corresponding to phase comparison between the images whose image capturing times are separated from each other.

(Noise Removing Table)

FIG. 9 is a table showing the structure of a noise removing table 910 according to this example embodiment. The noise removing table 910 is used by the noise remover 833 to remove noise of the phase statistics (phase change) calculated by the phase statistics computer 431. Note that the structure of the noise removing table 910 is not limited to that shown in FIG. 9.

The noise removing table 910 stores, in association with a class ID 911 and a phase statistics 912, a plurality of noise removing methods 913 and phase statistics 914 each obtained by performing noise removal by the corresponding noise removing method 913. The noise removing methods 913 include selection of a maximum eigenvector obtained by eigenvalue decomposition, selection of several large eigenvectors obtained by eigenvalue decomposition, and elimination of phase comparison between images whose image capturing times are separated from each other.

<<Processing Procedure of Image Processing Apparatus>>

FIG. 10 is a flowchart illustrating the processing procedure of the image processing apparatus 800 according to this example embodiment. This flowchart is executed by a CPU 610 shown in FIG. 6, to which the noise removing table 910 is added, using a RAM 640, thereby implementing the functional components shown in FIGS. 2 and 8. Note that in FIG. 10, the same step numbers as in FIG. 7 denote the same steps and a repetitive description thereof will be omitted.

In steps S207 to S705, the image processing apparatus 800 operates, similar to FIG. 7. After that, in step S1006, the image processing apparatus 800 removes the influence of noise from the statistics in the cluster calculated in Step S705. In step S707, the image processing apparatus 800 calculates, by the same method as in FIG. 7, the correlation indicating the degree of matching between the representative phase change of each cluster and a phase change of an evaluation target using the statistics from which the influence of noise has been removed. Therefore, a pixel with a stronger correlation is more hardly influenced by noise, and can be determined to be more likely a persistent scatterer appropriate for displacement analysis.

According to this example embodiment, it is possible to specify persistent scatterers necessary for displacement analysis with respect to a target whose displacement is nonlinear, a target whose elevation is high, or a target whose displacement is large. Especially, this example embodiment includes, as a component, a portion that removes the influence of noise, and it is possible to specify persistent scatterers more robustly.

Fourth Example Embodiment

An image processing apparatus according to the fourth example embodiment of the present invention will be described next. The image processing apparatus according to this example embodiment is different from that according to the above-described second example embodiment in that a correlation computer and a phase statistics computer of a phase correlation calculator are reversed. The remaining components and operations are similar to those in the second example embodiment. Hence, the same reference numerals denote the similar components and operations, and a detailed description thereof will be omitted.

(Phase Correlation Calculator)

Figure 11:
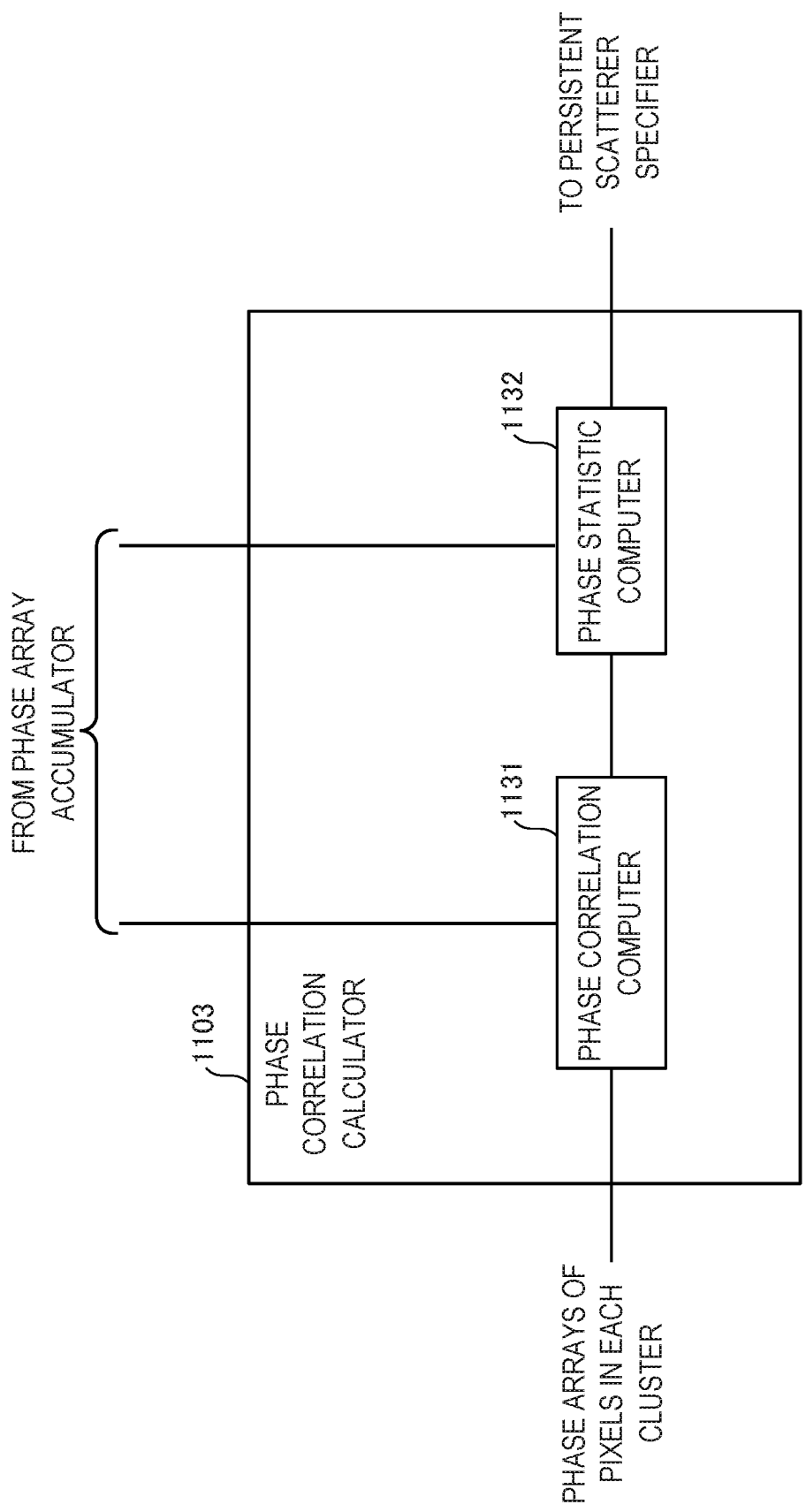
FIG. 11 is a block diagram showing the functional arrangement of a phase correlation calculator according to the fourth example embodiment of the present invention.

FIG. 11 is a block diagram showing the functional arrangement of a phase correlation calculator 1103 of an image processing apparatus 1100 according to this example embodiment. Note that the arrangement of the image processing apparatus 1100 is obtained by replacing the phase correlation calculator 203 shown in FIG. 2 by the phase correlation calculator 1103.

The phase correlation calculator 1103 according to this example embodiment includes a phase correlation computer 1131 and a phase statistics computer 1132. The phase correlation computer 1131 computes the correlation between a phase array accumulated in a phase array accumulator 201 at each pixel of an entire image and a phase array at each scatterer (pixel) forming each cluster classified by a clustering unit 202. With respect to the correlation with a phase change at each scatterer (pixel) forming each cluster, which has been calculated for each scatterer (pixel) of the entire image, for example, the phase statistics computer 1132 computes a statistics such as the average value of the correlations in the cluster.

The phase correlation calculator 1103 calculates the statistics of the correlation of the phase change between each evaluation target and each pixel forming each cluster.

(Phase Correlation Computer)

The phase correlation computer 1131 calculates the correlation of the phase change between each pixel of the entire image and each pixel forming each cluster. The correlation between the phase changes of the pixels is computed, as follows. Assume that i represents the index of a pixel as a correlation specifying target, C represents a cluster, and j∈C represents the index of a pixel in the cluster C. If an element of a phase array at the pixel i is stored in a column vector $s_i$, and an element of a phase array observed at a pixel j is stored in a column vector $s_j$, a correlation corr(i, j) between the phase changes at the pixels i and j is calculated by:

$$corr(i, j) = \left| \frac{s_i^* s_j}{\|s_i\| \|s_j\|} \right| \quad (5)$$

A monotonically nondecreasing function with respect to a positive number may be fitted to the correlation between the phase changes at the pixels i and j. For example, the correlation may be squared. Alternatively, a function that outputs "0 (zero)" to an input of a given threshold or less may be applied. By applying such function, it is possible to perform evaluation by removing the influence of a pixel with an extremely weak correlation.

(Phase Statistics Computer)

The phase statistics computer 1132 receives the correlation between the phase array of each pixel of the entire image and the phase array at each pixel forming each cluster, which has been calculated by the phase correlation computer 1131. Then, the phase statistics computer 1132 calculates a statistics indicating the correlation between the phase array at each pixel of the entire image and the entire phase change at the pixels forming each cluster. If i represents a pixel as a correlation computation target and C represents a cluster as a correlation computation target, the phase statistics computer 1132 calculates, as a statistics concerning all the pixels j∈C included in the cluster C, a statistics corr(i, C) indicating a correlation with the entire cluster with respect to corr(i, j) obtained by equation (5). For example, an average value for j∈C of corr(i, j) is computed by:

$$corr(i, C) = \frac{\sum_{j \in C} corr(i, j)}{\sum_{j \in C} 1} \quad (6)$$

Alternatively, another statistics such as a maximum value, a mode, or a median may be used. For example, evaluation weighted in accordance with a distance using a monotonically nonincreasing weighting function may be performed. For example, if a weighted mean is used, let w(d) be a monotonically nonincreasing function with respect to d, and $r_i$ and $r_j$ be the positions of the pixels i and j. Then, the statistics may be specified by:

$$corr(i, C) = \frac{\sum_{j \in C} w(|r_i - r_j|) corr(i, j)}{\sum_{j \in C} w(|r_i - r_j|)} \quad (7)$$

The statistics calculated as described above and indicating the correlation between the phase array at each pixel of the entire image and the entire phase change at the pixels forming each cluster can be processed in almost the same manner as that for the correlation between the phase change at each pixel specified by the phase correlation calculator 203 according to the second example embodiment and the representative phase change of each cluster. That is, as the statistics indicating the correlation between the phase change at each pixel of entire image and the entire phase change at the pixels forming each cluster is stronger, it is possible to determine that the scatterer is more likely a persistent scatterer. In this example embodiment, since the statistics of the correlation of the entire cluster for each pixel is obtained for each cluster, the plurality of statistics are obtained for each pixel but are integrated into one value for each pixel, similar to the second example embodiment.

(Phase Correlation Table)

FIG. 12A is a table showing the structure of a phase correlation table 1210 according to this example embodiment. The phase correlation table 1210 is used by the phase correlation computer 1131 to calculate the correlation between the phase array of each pixel of the entire image and the phase array of each pixel forming each cluster. Note that the structure of the phase correlation table 1210 is not limited to that shown in FIG. 12A.

The phase correlation table 1210 stores calculated phase correlation values of all sets between a phase array cluster 561 of the respective scatterers (pixels) and a phase array cluster 1262 of the respective scatterers (pixels) classified into the respective clusters.

(Phase Statistics Table)

FIG. 12B is a table showing the structure of a phase statistics table 1220 according to this example embodiment. The phase statistics table 1220 is used by the phase statistics computer 1132 to calculate the statistics indicating the correlation between the phase array at each pixel and the phase change of each cluster from the correlation between the phase array of each pixel calculated by the phase correlation computer 1131 and the phase array of each pixel forming each cluster. Note that the structure of the phase statistics table 1220 is not limited to that shown in FIG. 12B.

The phase statistics table 1220 stores phase statistics 1222, 1223, ... of the respective clusters in association with a scatterer ID (pixel ID) 1221. Each of the phase statistics 1222, 1223, ... of the respective clusters stores a correlation cluster between each scatterer ID (pixel ID) 1221 and the respective scatterers (pixels) in the cluster, and a correlation average or a correlation weighted means calculated from the correlation cluster as a correlation statistics.

<<Processing Procedure of Image Processing Apparatus>>

Figure 13:
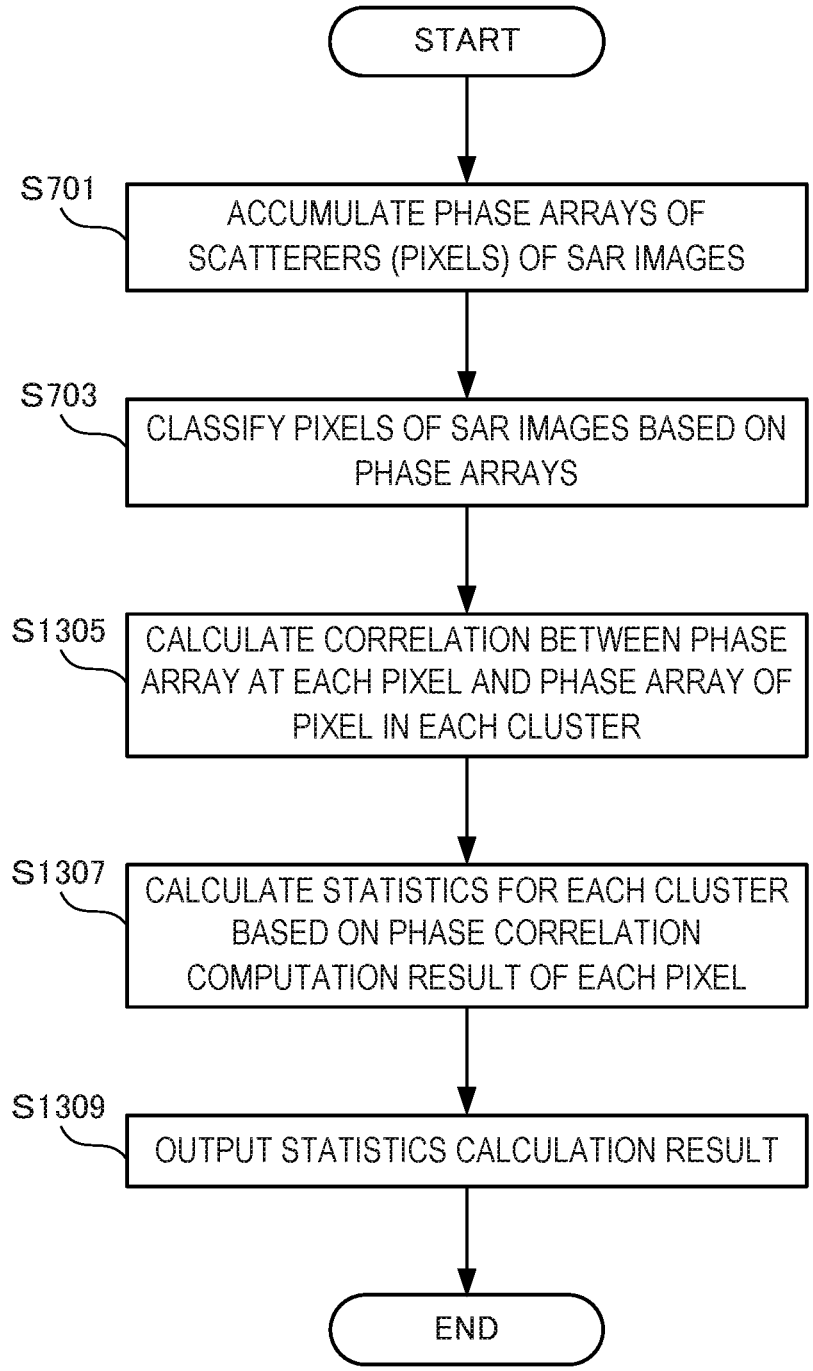
FIG. 13 is a flowchart illustrating the processing procedure of an image processing apparatus according to the fourth example embodiment of the present invention.

FIG. 13 is a flowchart illustrating the processing procedure of the image processing apparatus 1100 according to this example embodiment. This flowchart is executed by a CPU 610 shown in FIG. 6 including the phase correlation table 1210 and the phase statistics table 1220 using a RAM 640, thereby implementing the functional components shown in FIGS. 2 and 11. Note that in FIG. 13, the same step numbers as in FIG. 7 denote the same steps and a repetitive description thereof will be omitted. In steps S701 and S703, the image processing apparatus 1100 operates, similar to FIG. 7.

In step S1305, the image processing apparatus 1100 calculates the correlation between a phase array at each pixel of the entire image and a phase array at each pixel forming each cluster. In step S1307, the image processing apparatus 1100 calculates a correlation statistics for each cluster with respect to the correlations, calculated in step S1305, between the phase array at each pixel and the phase arrays at the pixels forming each cluster. In step S1309, the image processing apparatus 1100 outputs the calculated correlation statistics intact, or integrates and outputs the statistics. As the finally calculated statistics for the correlation in the cluster is stronger, it can be determined that the scatterer is a persistent scatterer that is more hardly influenced by noise and is more appropriate for displacement analysis.

According to this example embodiment, it is possible to specify persistent scatterers necessary for displacement analysis with respect to a target whose displacement is nonlinear, a target whose elevation is high, or a target whose displacement is large. Especially in this example embodiment, since the correlation between the phase change at each pixel of the entire image and the phase change at each pixel forming each cluster is calculated, it is possible to perform evaluation for each pixel of the entire image by removing the influence of a pixel having an extremely different phase change from the pixels forming each cluster. This evaluation method is useful when, for example, a cluster is not sufficiently divided by a clustering algorithm and persistent scatterers are specified in a state in which a plurality of clusters are mixed.

Note that in this example embodiment, when, for example, the phase statistics computer 1132 calculates, as a statistics, a mode other than an average, the effect of further removing the influence of noise can be obtained.

Fifth Example Embodiment

An image processing apparatus according to the fifth example embodiment of the present invention will be described next. The image processing apparatus according to this example embodiment is different from that according to each of the above-described second to fourth example embodiments in that the calculation result of a phase correlation calculator is fed back to a persistent scatterer candidate specifier. The remaining components and operations are similar to those in the second example embodiment. Hence, the same reference numerals denote the similar components and operations, and a detailed description thereof will be omitted.

<<Functional Arrangement of Image Processing Apparatus>>

Figure 14:
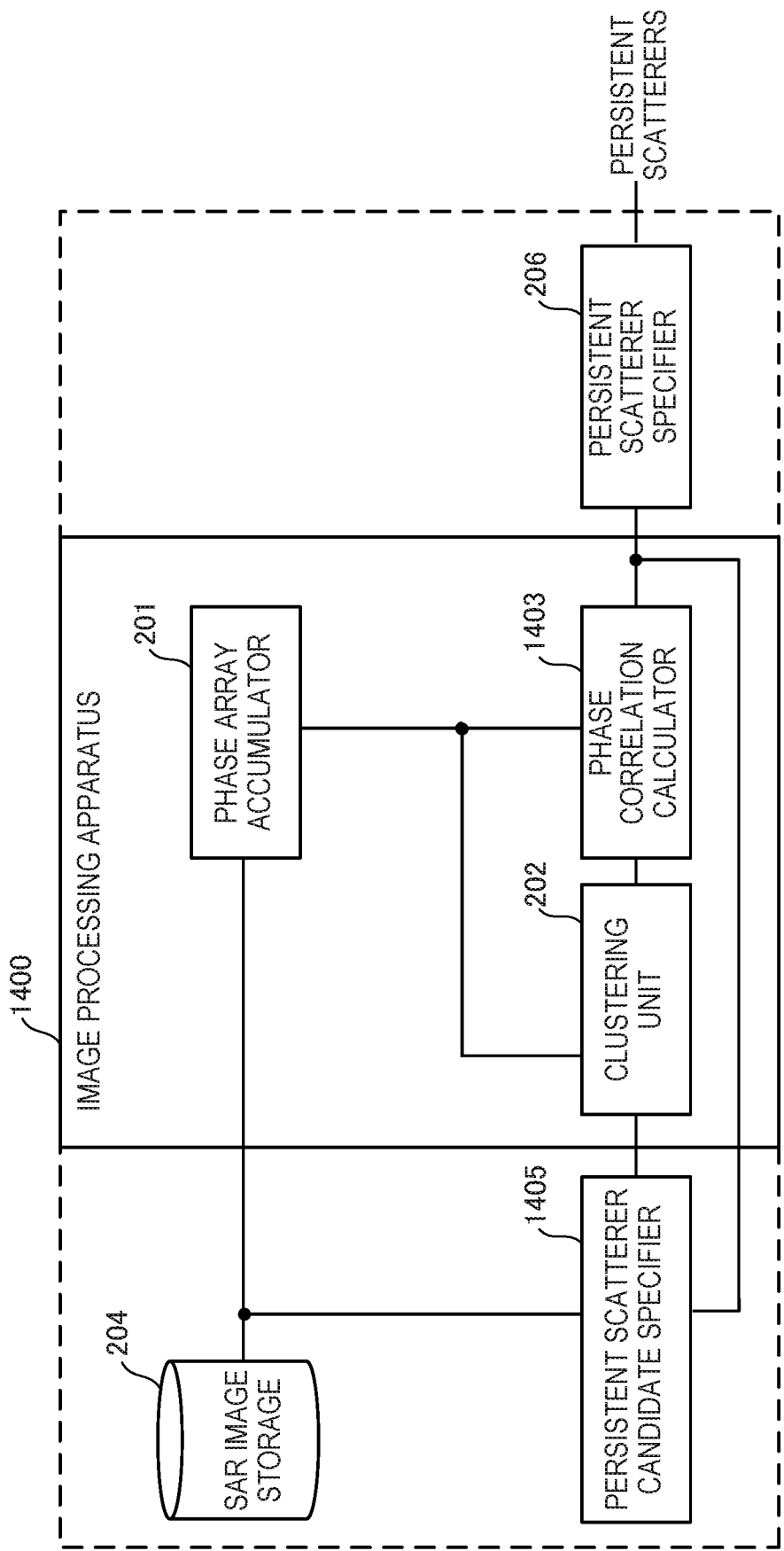
FIG. 14 is a block diagram showing the functional arrangement of an image processing apparatus according to the fifth example embodiment of the present invention.

FIG. 14 is a block diagram showing the functional arrangement of an image processing apparatus 1400 according to this example embodiment. Note that in FIG. 14, the same reference numerals denote functional components similar to those shown in FIG. 2 and a repetitive description thereof will be omitted. Referring to FIG. 14, the phase correlation calculator 203 and the persistent scatterer candidate specifier 205 in FIG. 2 are replaced by a phase correlation calculator 1403 and a persistent scatterer candidate specifier 1405, and these components are connected by a feedback line.

The persistent scatterer candidate specifier 1405 specifies pixels that can be persistent scatterers. Especially, the persistent scatterer candidate specifier 1405 according to this example embodiment is different from the persistent scatterer candidate specifier 205 according to the second example embodiment in that it has a function of specifying again persistent scatterer candidates based on correlations calculated by the phase correlation calculator 1403. A clustering unit 202 receives the persistent scatterer candidates specified again by the persistent scatterer candidate specifier 1405, and performs clustering again. For a phase array at each pixel of an entire image, the phase correlation calculator 1403 calculates a correlation with a phase change representing each cluster obtained by performing clustering again by the clustering unit 202. The correlations calculated by the phase correlation calculator 1403 are fed back to the persistent scatterer candidate specifier 1405, thereby specifying persistent scatterer candidates again.

Note that as the phase correlation calculator 1403, the phase correlation calculator 203 according to the above-described second example embodiment, the phase correlation calculator 803 according to the above-described third example embodiment, or the phase correlation calculator 1103 according to the above-described fourth example embodiment may be used.

(Persistent Scatterer Candidate Table)

FIG. 15 is a table showing the structure of a persistent scatterer candidate table 1530 according to this example embodiment. The persistent scatterer candidate table 1530 is used by the persistent scatterer candidate specifier 1405 to repeatedly specify, based on the correlation, a persistent scatterer candidate among scatterers (pixels) in a plurality of SAR images. Note that in FIG. 15, the same reference numerals denote components similar to those shown in FIG. 5C and a repetitive description thereof will be omitted. The structure of the persistent scatterer candidate table 1530 is not limited to that shown in FIG. 15.

The persistent scatterer candidate table 1530 stores, in association with each scatterer ID (pixel ID) 531, a phase correlation calculation result 1532 fed back from the phase correlation calculator 1403, and a persistent scatterer candidate flag 1533 changed based on the phase correlation calculation result 1532. If the persistent scatterer candidate flag 1533 is "1", the scatterer is a persistent scatterer candidate, and if the persistent scatterer candidate flag 1533 is "0", the scatterer is not a persistent scatterer candidate. For example, a scatterer (pixel) whose scatterer ID (pixel ID) 531 is "A0001-0002" was a persistent scatterer candidate first but was excluded from persistent scatterer candidates based on the phase correlation calculation result 1532.

<<Processing Procedure of Image Processing Apparatus>>

FIG. 16 is a flowchart illustrating the processing procedure of the image processing apparatus 1400 according to this example embodiment. This flowchart is executed by a CPU 610 shown in FIG. 6 including the persistent scatterer candidate table 1530 using a RAM 640, thereby implementing the functional components shown in FIG. 14. Note that in FIG. 14, the same step numbers as in FIG. 7 denote the same steps and a repetitive description thereof will be omitted. In step S701, the image processing apparatus 1400 operates, similar to FIG. 7.

In step S1603, the image processing apparatus 1400 specifies, as persistent scatterer candidates, pixels that can be persistent scatterers. In step S1605, the image processing apparatus 1400 classifies the persistent scatterer candidates based on phase arrays. In step S1607, the image processing apparatus 1400 calculates the correlation between the representative phase change of each cluster and the phase array at each pixel of an entire image. Note that in step S1607, steps S705 and S707 of FIG. 7, steps S705, S1006, and S707 of FIG. 10, or steps S1305 and S1307 of FIG. 13 are executed.

In step S1609, the image processing apparatus 1400 determines whether the specified cluster or the phase correlation with the specified cluster satisfies an end condition. As the end condition, for example, a condition that the process is repeated a predetermined number of times can be used. Alternatively, if the correlations at pixels as persistent scatterer candidates among evaluation target pixels are stronger than a predetermined value, it may be determined that the end condition is satisfied by determining that all the persistent scatterer candidates satisfy a condition as a persistent scatterer, that is, that the persistent scatterer candidate specifier 1405 correctly specifies persistent scatterers.

If the end condition is not satisfied, the image processing apparatus 1400 feeds back, in step S1611, the current phase correlation calculation result to the persistent scatterer candidate specifier 1405, and repeats, from step S1603, the processing by updating or redoing specification of persistent scatterer candidates. If the end condition is satisfied, the image processing apparatus 1400 ends the processing by outputting the phase correlation calculation result of the narrowed persistent scatterer candidates in step S1613.

As a finally calculated statistics for the correlation in the cluster is stronger, it can be determined that the scatterer is a persistent scatterer that is more hardly influenced by noise and is more appropriate for displacement analysis.

According to this example embodiment, it is possible to specify persistent scatterers necessary for displacement analysis with respect to a target whose displacement is nonlinear, a target whose elevation is high, or a target whose displacement is large. Especially in this example embodiment, it is possible to calculate a correlation that can evaluate a persistent scatterer likelihood more correctly by specifying a persistent scatterer candidate again in accordance with the strength of the correlation specified for each pixel of the entire image. This is because, by extracting a cluster for a persistent scatterer candidate determined to include little noise and making the specifying result of the persistent scatterer candidate more correct, it is possible to reduce the influence of noise when correlating a phase change representing the cluster of the persistent scatterer candidate and a phase change at each pixel of the entire image.

Other Example Embodiments

The present invention is applicable to a program for analyzing the displacement of a target, which is nonlinear or large, such as a high rise building or bridge using SAR images. The present invention is also applicable to a synthetic aperture sonar using ultrasound waves. According to the present invention, by extracting a pixel having a stable phase in a cluster, it is possible to find a target that is kept buried in noise when only reflection intensity is used. The present invention is also applicable to a phase image captured by a time-of-flight camera or the like. By applying the present invention, it is possible to identify, for a target whose position is moved more or less, whether a fluctuation in observed value is caused by noise, thereby extracting the three-dimensional shape of the target robustly. The present invention is also applicable to a phase image using interference of coherent light.

As a precise distortion measurement method using a phase generated by interference between a pattern of an image sensor or the like and a pattern added to an image capturing target, there is provided a sampling moire method. However, it is difficult to identify, when measuring an interference result, whether a signal fluctuates due to noise or the target moves. With this method, by checking whether the phase synchronously changes, it becomes possible to separate a case in which the target moves and a case in which much noise is included.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims. A system or apparatus including any combination of the individual features included in the respective example embodiments may be incorporated in the scope of the present invention.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

Other Expressions of Example Embodiments

Some or all of the above-described example embodiments can also be described as in the following supplementary notes but are not limited to the followings.

(Supplementary Note 1)

There is provided an image processing apparatus comprising:

a phase array accumulator that accumulates phase arrays of respective pixels over a plurality of images;

a clustering unit that classifies the respective pixels into a plurality of clusters based on the phase arrays; and a phase correlation calculator that calculates a correlation between a phase change in each of the plurality of clusters and the phase array at the respective pixels.

(Supplementary Note 2)

There is provided the image processing apparatus according to supplementary note 1, wherein the phase correlation calculator includes a first phase statistics computer that computes a statistics of a representative phase change in each of the plurality of clusters, and a first phase correlation computer that computes a correlation between the representative phase change and the phase array at the respective pixels.

(Supplementary Note 3)

There is provided the image processing apparatus according to supplementary note 2, wherein the first phase statistics computer sets an average of phase arrays of a plurality of pixels in the each of the plurality of clusters as the statistics of the representative phase change.

(Supplementary Note 4)

There is provided the image processing apparatus according to supplementary note 3, wherein the first phase statistics computer performs weighting in correspondence with a position of each of the plurality of pixels.

(Supplementary Note 5)

There is provided the image processing apparatus according to any one of supplementary notes 2 to 4, wherein the phase correlation calculator further includes a noise remover that removes an influence of noise on the representative phase change in the each of the plurality of clusters.

(Supplementary Note 6)

There is provided the image processing apparatus according to supplementary note 5, wherein the noise remover performs eigenvalue decomposition of the statistics of the representative phase change computed by the first phase statistics computer, and sets a maximum eigenvector as the representative phase change from which the influence of the noise has been removed.

(Supplementary Note 7)

There is provided the image processing apparatus according to supplementary note 5, wherein the noise remover performs eigenvalue decomposition of the statistics of the representative phase change computed by the first phase statistics computer, and sets several eigenvectors from a maximum eigenvector as the representative phase change from which the influence of the noise has been removed.

(Supplementary Note 8)

There is provided the image processing apparatus according to supplementary note 5, wherein the noise remover sets the representative phase change, from which the influence of the noise has been removed, by eliminating a component corresponding to comparison of phases whose image acquisition times are separated from each other.

(Supplementary Note 9)

There is provided the image processing apparatus according to supplementary note 1, wherein the phase correlation calculator includes a second phase correlation computer that computes a correlation between a phase array of the respective pixels in the each of the plurality of clusters and the phase array at the each of the plurality of pixels, and a second phase statistics computer that computes a statistics of a representative correlation in the each of the plurality of clusters.

(Supplementary Note 10)

There is provided the image processing apparatus according to supplementary note 9, wherein the second phase statistics computer sets an average of correlations at a plurality of pixels in the each of the plurality of clusters as the statistics of the presentative correlation.

(Supplementary Note 11)

There is provided the image processing apparatus according to supplementary note 10, wherein the second phase statistics computer performs weighting in correspondence with a position of the each of the Plurality of pixels.

(Supplementary Note 12)

There is provided the image processing apparatus according to any one of supplementary notes 1 to 11, wherein the phase correlation calculator includes processing of integrating the calculated correlations.

(Supplementary Note 13)

There is provided the image processing apparatus according to any one of supplementary notes 1 to 12, further comprising a persistent scatterer candidate specifier that specifies, from the respective pixels over the plurality of images, candidate pixels of persistent scatterers at which reflection is stable.

(Supplementary Note 14)

There is provided the image processing apparatus according to supplementary note 13, wherein the persistent scatterer candidate specifier updates specification of candidate pixels of persistent scatterers again based on the correlation calculated by the phase correlation calculator.

(Supplementary Note 15)

There is provided the image processing apparatus according to supplementary note 14, wherein the specification of the candidate pixels of the persistent scatterers by the persistent scatterer candidate specifier and the calculation of the correlation by the phase correlation calculator are repeated a predetermined number of times or repeated until a correlation of a persistent scatterer candidate becomes not less than a predetermined value.

(Supplementary Note 16)

There is provided the image processing apparatus according to any one of supplementary notes 1 to 15, further comprising a persistent scatterer specifier that specifies persistent scatterers with reference to the phase correlation calculated by the phase correlation calculator.

(Supplementary Note 17)

There is provided an image processing method comprising:

accumulating phase arrays of respective pixels over a plurality of images in a phase array accumulator;

classifying the respective pixels into a plurality of clusters based on the phase arrays; and calculating a correlation between a phase change in each of the plurality of clusters and the phase array at the respective pixels.

(Supplementary Note 18)

There is provided an image processing program for causing a computer to execute a method, comprising:

accumulating phase arrays of respective pixels over a plurality of images in a phase array accumulator;

classifying the respective pixels into a plurality of clusters based on the phase arrays; and calculating a correlation between a phase change in each of the plurality of clusters and the phase array at the respective pixels.

(Supplementary Note 19)

There is provided a SAR image analysis system comprising:

an image processing apparatus that specifies persistent scatterers based on a plurality of SAR images; and a SAR image analysis apparatus that analyzes the plurality of SAR images using data of the persistent scatterers, the image processing apparatus comprising, at least, a phase array accumulator that accumulates phase arrays of respective pixels over the plurality of SAR images, a clustering unit that classifies the respective pixels into a plurality of clusters based on the phase arrays, and a phase correlation calculator that calculates a correlation between a phase change in each of the plurality of clusters and the phase array at the respective pixels.

(Supplementary Note 20)

There is provided a SAR image analysis method comprising:

specifying persistent scatterers based on a plurality of SAR images; and analyzing the plurality of SAR images using data of the persistent scatterers, wherein the specifying persistent scatterers includes, at least, accumulating phase arrays of respective pixels over the plurality of SAR images in a phase array accumulator;

classifying the respective pixels into a plurality of clusters based on the phase arrays; and calculating a correlation between a phase change in each of the plurality of clusters and the phase array at the respective pixels.

What is claimed is:

1. An image processing apparatus comprising:
a phase array accumulator that accumulates a phase array at each pixel over a plurality of images;
a clustering unit that classifies the each pixel into a plurality of clusters based on the phase array at the each pixel; and
a phase correlation calculator that calculates a correlation between a representative phase change in each cluster of the plurality of clusters and the phase array at the each pixel.

2. The image processing apparatus according to claim 1, wherein said phase correlation calculator includes
a first phase statistics computer that computes a statistics of the representative phase change in the each cluster, and
a first phase correlation computer that computes a correlation between the statistics of the representative phase change and the phase array at the each pixel.

3. The image processing apparatus according to claim 2, wherein said first phase statistics computer sets an average of phase arrays of a plurality of pixels classified into the each cluster as the statistics of the representative phase change.

4. The image processing apparatus according to claim 3, wherein said first phase statistics computer performs weighting in correspondence with a position of each of the plurality of pixels.

5. The image processing apparatus according to claim 2, wherein said phase correlation calculator further includes a noise remover that removes an influence of noise on the representative phase change in the each cluster.

6. The image processing apparatus according to claim 5, wherein said noise remover performs eigenvalue decomposition of the statistics of the representative phase change computed by said first phase statistics computer, and sets a maximum eigenvector as the representative phase change from which the influence of the noise has been removed.

7. The image processing apparatus according to claim 5, wherein said noise remover performs eigenvalue decomposition of the statistics of the representative phase change computed by said first phase statistics computer, and sets several eigenvectors from a maximum eigenvector as the representative phase change from which the influence of the noise has been removed.

8. The image processing apparatus according to claim 5, wherein said noise remover sets the representative phase change, from which the influence of the noise has been removed, by eliminating a component corresponding to comparison of phases whose image acquisition times are separated from each other.

9. The image processing apparatus according to claim 1, wherein said phase correlation calculator includes
a second phase correlation computer that computes a correlation between a phase array at each of a plurality of pixels classified into the each cluster and the phase array at the each pixel, and
a second phase statistics computer that computes a statistics of a representative correlation in the each cluster.

10. The image processing apparatus according to claim 9, wherein said second phase statistics computer sets an average of correlations at the plurality of pixels classified into the each cluster as the statistics of the presentative correlation.

11. The image processing apparatus according to claim 10, wherein said second phase statistics computer performs weighting in correspondence with a position of the each of the plurality of pixels.

12. The image processing apparatus according to claim 1, wherein said phase correlation calculator includes processing of integrating the calculated correlations.

13. The image processing apparatus according to claim 1, further comprising a persistent scatterer candidate specifier that specifies, from a plurality of pixels over the plurality of images, candidate pixels of persistent scatterers at which reflection is stable.

14. The image processing apparatus according to claim 13, wherein said persistent scatterer candidate specifier updates specification of candidate pixels of persistent scatterers again based on the correlation calculated by said phase correlation calculator.

15. The image processing apparatus according to claim 14, wherein the specification of the candidate pixels of the persistent scatterers by said persistent scatterer candidate specifier and the calculation of the correlation by said phase correlation calculator are repeated a predetermined number of times.

16. The image processing apparatus according to claim 1, further comprising a persistent scatterer specifier that specifies persistent scatterers with reference to the phase correlation calculated by said phase correlation calculator.

17. A non-transitory computer-readable storage medium storing an image processing program for causing a computer to execute a method, comprising:
accumulating a phase array at each pixel over a plurality of images in a phase array accumulator;
classifying the each pixel into a plurality of clusters based on the phase array at the each pixel; and
calculating a correlation between a representative phase change in each cluster of the plurality of clusters and the phase array at the each pixel.

18. A SAR image analysis method comprising:
specifying persistent scatterers based on a plurality of SAR images; and
analyzing the plurality of SAR images using data of the persistent scatterers,
wherein the specifying persistent scatterers includes, at least,
accumulating a phase array at each pixel over the plurality of SAR images in a phase array accumulator;
classifying the each pixel into a plurality of clusters based on the phase array at the each pixel; and
calculating a correlation between a representative phase change in each cluster of the plurality of clusters and the phase array at the each pixel.

19. The image processing apparatus according to claim 14, wherein the specification of the candidate pixels of the persistent scatterers by said persistent scatterer candidate specifier and the calculation of the correlation by said phase correlation calculator are repeated until a correlation of a persistent scatterer candidate becomes not less than a predetermined value.

20. The image processing apparatus according to claim 13, further comprising a persistent scatterer specifier that specifies persistent scatterers with reference to the phase correlation calculated by said phase correlation calculator.

* * * * *